(12) United States Patent
Fukuhara

(10) Patent No.: US 10,284,879 B2
(45) Date of Patent: May 7, 2019

(54) IMAGE PROCESSING APPARATUS AND METHOD BASED ON INTEGERPRECISION IMAGE DATA

(71) Applicant: SONY CORPORATION, Tokyo (JP)

(72) Inventor: Takahiro Fukuhara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/315,047

(22) PCT Filed: Jun. 23, 2015

(86) PCT No.: PCT/JP2015/067982
§ 371 (c)(1),
(2) Date: Nov. 30, 2016

(87) PCT Pub. No.: WO2016/002577
PCT Pub. Date: Jan. 7, 2016

(65) Prior Publication Data
US 2017/0201772 A1    Jul. 13, 2017

(30) Foreign Application Priority Data
Jul. 3, 2014  (JP) .................................. 2014-137439

(51) Int. Cl.
G06K 9/36    (2006.01)
G06K 9/46    (2006.01)
(Continued)

(52) U.S. Cl.
CPC ............. *H04N 19/91* (2014.11); *H04N 19/12* (2014.11); *H04N 19/124* (2014.11);
(Continued)

(58) Field of Classification Search
USPC .................................. 382/233, 166; 708/495
See application file for complete search history.

(56) References Cited

U.S. PATENT DOCUMENTS 6,731,289 B1 *   5/2004  Peercy .................. G06F 3/1423
                                                    345/3.1
8,745,111 B2 *   6/2014  Ollmann ................. G06F 7/483
                                                    708/204
(Continued)

FOREIGN PATENT DOCUMENTS

JP    2006-121669 A     5/2006
JP    2007-318711 A     12/2007
(Continued)

OTHER PUBLICATIONS

International Search Report and Written Opinion of PCT Application No. PCT/JP2015/067982, dated Aug. 11, 2015, 7 pages of English Translation and 7 pages of ISRWO.

(Continued)

*Primary Examiner* — Kathleen Y Dulaney
(74) *Attorney, Agent, or Firm* — Chip Law Group

(57) ABSTRACT

The present technology relates to an image processing apparatus and method that enable suppression of increase in the load of encoding and decoding floating point-precision image data. The image processing apparatus of the present technology transforms floating point-precision image data composed of a sign, an exponent, and a mantissa into integer-precision image data, and encodes the integer-precision image data obtained by transformation. The present technology can be applied to image processing apparatuses such as encoding apparatuses that encode image data and decoding apparatuses that decode encoded data obtained by encoding image data, for example.

7 Claims, 22 Drawing Sheets

(51) Int. Cl.
  *G06F 7/38* (2006.01)
  *H04N 19/91* (2014.01)
  *H04N 19/70* (2014.01)
  *H04N 19/63* (2014.01)
  *H04N 19/85* (2014.01)
  *H04N 19/124* (2014.01)
  *H04N 19/44* (2014.01)
  *H04N 19/172* (2014.01)
  *H04N 19/12* (2014.01)
  *H04N 19/157* (2014.01)
  *H04N 19/40* (2014.01)

(52) U.S. Cl.
  CPC ......... *H04N 19/157* (2014.11); *H04N 19/172* (2014.11); *H04N 19/40* (2014.11); *H04N 19/44* (2014.11); *H04N 19/63* (2014.11); *H04N 19/70* (2014.11); *H04N 19/85* (2014.11)

(56) References Cited

U.S. PATENT DOCUMENTS

| | | | | |
|---|---|---|---|---|
| 8,880,571 | B2* | 11/2014 | Srinivasan | H03M 7/24 708/200 |
| 9,473,793 | B2* | 10/2016 | Fukuhara | G06T 9/00 |
| 2005/0078118 | A1* | 4/2005 | Airey | G06T 15/005 345/531 |
| 2007/0256057 | A1 | 11/2007 | Matsubara | |
| 2007/0258641 | A1* | 11/2007 | Srinivasan | H03M 7/24 382/166 |
| 2008/0001961 | A1* | 1/2008 | Roimela | G06T 3/4007 345/582 |
| 2009/0175548 | A1 | 7/2009 | Fukuhara et al. | |
| 2012/0262597 | A1* | 10/2012 | Frantz | H04N 5/23229 348/222.1 |
| 2013/0177240 | A1* | 7/2013 | Thoma | H03M 7/24 382/166 |
| 2013/0330016 | A1* | 12/2013 | Fukuhara | G06T 9/00 382/244 |
| 2014/0112473 | A1* | 4/2014 | Gassi | H04L 9/28 380/255 |
| 2016/0371822 | A1* | 12/2016 | Le Pendu | H04N 19/147 |

FOREIGN PATENT DOCUMENTS

| | | |
|---|---|---|
| JP | 2009-278609 A | 11/2009 |
| JP | 2013-517723 A | 5/2013 |
| JP | 2013-255179 A | 12/2013 |

OTHER PUBLICATIONS

International Preliminary Report on Patentability of PCT Application No. PCT/JP2015/067982, dated Jan. 12, 2017, 7 pages of English Translation and 4 pages of IPRP.

* cited by examiner

FIG. 6

| Value | Meaning |
|---|---|
| 75 | Codestream contains a JPEG XR (ITU-T Rec. T.832 | ISO/IEC 29199-2) compliant bitstream. |
| 76 | Codestream contains a Sub-baseline profile JPEG XR (ITU-T Rec. T.832 | ISO/IEC 29199-2) compliant bitstream. |
| 77 | Codestream contains a Baseline profile JPEG XR (ITU-T Rec. T.832 | ISO/IEC 29199-2) compliant bitstream. |
| 78 | Codestream contains a Main profile JPEG XR (ITU-T Rec. T.832 | ISO/IEC 29199-2) compliant bitstream. |
| 79 | Codestream contains an Advanced profile JPEG XR (ITU-T Rec. T.832 | ISO/IEC 29199-2) compliant bitstream. |
| 80 | Pixel format "Fixed Point" is used. |
| 81 | Pixel format "Floating Point" is used. |
| 82 | Pixel Formats "Mantissa" or "Exponent" are used. |
| 83 | Compositing layer uses IEC 61966-2-2 (scRGB) enumerated colourspace |
| 84 | Block Coder Extensions (see AMD. 4 of ITU-T 801 | ISO/IEC 15444-2) |
| 85 | Compositing layer uses scRGB gray scale (IEC 61966-2-2 based) enumerated colourspace |

FIG. 8

| Value of F$^i$ | Meaning |
|---|---|
| 0000 0000 0000 0000 | Bit patterns are interpreted as signed or unsigned integers using a binary two's complement representation. |
| 0001 0000 0000 0000 | The bit pattern is interpreted as a signed or unsigned integer representing the mantissa of a floating point with a common exponent coming from a channel using an exponent pixel format (see below)associated to the same colour or all of the image. The channel association is defined in the Channel Definition Box. The numerical value of the channel is to be reconstructed by<br><br>$v = mantissa * 2^{exponent-136}$<br><br>The association of the combined sample value is defined by the Typ$^j$ value in the Channel Definition Box of the channel representing the mantissa. |
| 0010 0000 0000 0000 | The bit pattern of the channel is to be interpreted as a signed or unsigned integer representing an exponent of a floating point number. The mantissa of this number is described by a channel associated to the same colour or all of the image.<br><br>The Typ$^j$ value of an exponent channel in the Channel Definition Box shall be ignored. |
| 0011 ffff ffff ffff | The bit pattern of the channel is to be interpreted as fixed point number with f fractional bits(i.e. bits to the right of the binary point) or equivalently, a fixed point number that is pre-shifted by f bits. The number of integer bits is given as the difference of the bit depths of the corresponding source component minus the number of fractional bits. The fractional value is reconstructed by dividing the integer value of the corresponding channel by $2^f$. |
| 0100 mmmm nnnnn mmmmm | The bit pattern of the channel is to be interpreted as floating point number with one sign bit, exponent bits and m mantissa bits. The number of exponent bits is given by the bit precision of the component or palette entry used to define the channel, minus one, minus the number of mantissa bits. The topmost bit of the bit pattern is the sign bit, followed by the exponent bits, followed by the mantissa bits. The mantissa contains an implicit one bit that is not encoded, and the exponent is encoded as unsigned binary integer with a bias of size $2^{e-1}-1$, where e is the number of exponent bits. The reconstruction of the floating point number described by the bit pattern is defined by IEC 60559. |
| all other values | Reserved for future use. |

FIG. 9

| Value | Meaning |
|---|---|
| 0100 0000 0001 0111 | IEC 60559 single precision(binary32) format. This format uses 23 mantissa bits, 8 exponent bits and one sign bit. The exponent encoding uses a bias of 127, normalized numbers use exponents between −126 and 127, denormalized numbers have an exponent value of −127, and NaNs and infinities an exponent value of 128. The corresponding components in the codestream must have a bit precision of 32 bits. |
| 0100 0000 0011 0100 | IEC 60559 double precision(binary64) format. This format uses 52 mantissa bits, 11 exponent bits and one sign bit, the exponent bias is 1023. |
| 0100 0000 0000 1010 | IEC 60559 half-float(binary16 or half precision)numbers. This format uses 10 mantissa bits, 5 exponent bits and one sign bit. The exponent bias is 15. Normalized numbers use exponent values between −14 and 15, denormalized numbers have an exponent value of −15. Infinities and NaNs are represented by the exponent value 16. This pixel format requires a component of 16 bits precision. |

FIG. 11

| Values(bits) MSB LSB | Meaning of Init values | STnit usage |
|---|---|---|
| 0000 0000 | No non-linearity transformation applied | |
| 0000 0001 | Gamma-style non-linearity transformation | Table A-45 |
| 0000 0010 | LUT-style non-linearity transformation | Table A-46 |
| 0000 0011 | Integer-Float Transformation | Table A-47 |
| | All other values reserved | |

FIG. 12

| Parameter | Size | Values | Meaning of SInit values |
|---|---|---|---|
| \<Half\> S E M | 1 5 10 | If $E \neq 0$, $h = (-1)^s \times 2^{(E-15)} \times (1 + M/2^{10})$ <br> If $E = 0$, $h = (-1)^s \times 2^{(-14)} \times (M/2^{10})$ <br> $(1 \leq M \leq 31)$ | Integer-Float Transformation(16bits) |
| \<Single\> S E M | 1 8 23 | If $E \neq 0$, $h = (-1)^s \times 2^{(E-127)} \times (1 + M/2^{23})$ <br> If $E = 0$, $h = (-1)^s \times 2^{(-126)} \times (M/2^{23})$ <br> $(1 \leq M \leq 63)$ | Integer-Float Transformation(32bits) |
| \<Double\> S E M | 1 11 52 | If $E \neq 0$, $h = (-1)^s \times 2^{(E-1023)} \times (1 + M/2^{52})$ <br> If $E = 0$, $h = (-1)^s \times 2^{(-1022)} \times (M/2^{52})$ <br> $(1 \leq M \leq 2024)$ | Integer-Float Transformation(64bits) |

IMAGE PROCESSING APPARATUS AND METHOD BASED ON INTEGERPRECISION IMAGE DATA

CROSS REFERENCE TO RELATED APPLICATIONS

This application is a U.S. National Phase of International Patent Application No. PCT/JP2015/067982 filed on Jun. 23, 2015, which claims priority benefit of Japanese Patent Application No. JP 2014-137439 filed in the Japan Patent Office on Jul. 3, 2014. Each of the above-referenced applications is hereby incorporated herein by reference in its entirety.

TECHNICAL FIELD

The present technology relates to an image processing apparatus and method, more specifically, to an image processing apparatus and method by which increase in the load of encoding and decoding floating point-precision image data can be suppressed.

BACKGROUND ART

Conventionally, a large number of research findings on encoded representation of floating point-precision images have been reported so far (for example, refer to Non-patent Document 1 and Non-patent Document 2). For example, Patent Document 1 proposes a two-stage encoding method by which tone mapping is performed to create a low-bit depth image and a difference between the decoded image and the original image is encoded by another coder. In addition, Patent Document 2 discusses application of Lloyd-Max quantization instead of tone mapping to reduce the bit rate at the time of lossy compression.

CITATION LIST

Patent Document

Non-patent Document 1: M. Winken, D. Marpe, etc., "Bit-depth Scalable Video Coding," Proc. IEEE Intl. Conf. on Image Processing, pp. 1-5 to 1-7, 2007
Non-patent Document 2: Ito, Bandoh, Takamura, Kamikura, Yashima, "A Study of Coding Method for High Bit Depth Image Using Bit Depth Transform," the 2009 IEICE General Conference, S-5, 2009

SUMMARY OF THE INVENTION

Problems to be Solved by the Invention

However, according to these methods, the internal operational precision suffers in processes of encoding and decoding, which may lead to an overflow.

The present technology is proposed in light of such circumstances. An object of the present technology is to enable suppression of increase in the load of encoding and decoding floating point-precision image data.

Solutions to Problems

One aspect of the present technology is an image processing apparatus including:

a data transform unit that transforms floating point-precision image data composed of a sign, an exponent, and a mantissa into integer-precision image data; and an encoding unit that encodes the integer-precision image data obtained through transformation by the data transform unit.

The data transform unit may transform the image data into one integer-precision data in which data of the sign, data of the exponent, and data of the mantissa are arranged in this order from MSB to LSB for individual pixels.

The data transform unit may transform the image data into three integer-precision image data in which data of the sign, data of the exponent, and data of the mantissa are independent of one another for individual pixels.

The data transform unit may transform data of the sign, data of the exponent, and data of the mantissa into three independent integer-precision image data for leading pixels of pictures of the image data, and may transform data of the exponent and data of the mantissa into two independent integer-precision image data for the other pixels.

The data transform unit may further transform the integer-precision image data into differential data between components for individual pixels, and the encoding unit may encode the differential data obtained through transformation by the data transform unit.

When the encoding unit performs lossless encoding, the data transform unit may transform the floating point-precision image data into the integer-precision image data, when the encoding unit performs lossy encoding, the data transform unit may transform the floating point-precision image data into the value of floating point precision, when performing the lossless encoding, the encoding unit may encode the integer-precision image data obtained through transformation by the data transform unit, and when performing the lossy encoding, the encoding unit may encode the value of floating point precision obtained through transformation by the data transform unit.

The encoding unit may encode the image data by a JPEG2000 encoding method.

An addition unit that adds information on the data transformation by the data transform unit to the encoded data obtained through encoding by the encoding unit may be further included.

The encoding unit may encode the image data by a JPEG2000 encoding method, and the addition unit may add the information to a predetermined position in a JPX file format.

In addition, one aspect of the present technology is an image processing method including: transforming floating point-precision image data composed of a sign, an exponent, and a mantissa into integer-precision image data; and encoding the integer-precision image data obtained by transformation.

Another aspect of the present technology is an image processing apparatus including: a decoding unit that decodes encoded data of integer-precision image data obtained by transforming floating point-precision image data composed of a sign, an exponent, and a mantissa; and a data transform unit that transforms the integer-precision image data obtained through decoding by the decoding unit into the floating point-precision image data.

The data transform unit may divide the integer-precision image data into three data in accordance with bit numbers, and may set the same as data of the sign, data of the exponent, and data of the mantissa in order from MSB to LSB.

The data transform unit may set the integer-precision image data into any one of data of the sign, data of the exponent, and data of the mantissa.

The data transform unit may set the integer-precision image data as any one of data of the sign, data of the exponent, and data of the mantissa for leading pixels of pictures of the image data, and may set the integer-precision image data as any one of data of the exponent and data of the mantissa for the other pixels.

The decoding unit may decode encoded data of differential data between components of the integer-precision image data, and the data transform unit may transform the differential data obtained through decoding by the decoding unit into the integer-precision image data and further transforms the same into the floating point-precision image data.

When the encoded data is obtained by performing lossless encoding on integer-precision image data obtained by transforming floating point-precision image data composed of a sign, an exponent, and a mantissa, the decoding unit may perform lossless decoding on the encoded data, and the data transform unit may transform the integer-precision image data obtained through lossless decoding by the decoding unit into the floating point-precision image data, and when the encoded data is obtained by performing lossy encoding on the value of floating point precision obtained by transforming the floating point-precision image data composed of a sign, an exponent, and a mantissa, the decoding unit may perform lossy decoding on the encoded data, and the data transform unit may transform the value of floating point precision obtained through lossy decoding by the decoding unit into the floating point-precision image data.

The encoded data may be encoded by a JPEG2000 encoding method, and the decoding unit may decode the encoded data by a JPEG2000 decoding method.

An analysis unit that analyzes information on data transformation of image data added to the encoded data may be further included, and the data transform unit may transform the image data into the floating point-precision image data in accordance with the result of analysis by the analysis unit.

The encoded data may be encoded by the JPEG2000 encoding method, the analysis unit may analyze the information added to the encoded data in a predetermined position of a JPX file format, and the decoding unit may decode the encoded data by the JPEG2000 decoding method.

In addition, another aspect of the present technology is an image processing method including: decoding encoded data of integer-precision image data obtained by transforming floating point-precision image data composed of a sign, an exponent, and a mantissa; and transforming the integer-precision image data obtained by decoding into the floating point-precision image data.

In one aspect of the present technology, floating point-precision image data composed of a sign, an exponent, and a mantissa is transformed into integer-precision image data, and the integer-precision image data obtained by the transformation is encoded.

In another aspect of the present technology, integer-precision image data transformed from the floating point-precision image data composed of a code, an exponent, and a mantissa is decoded, and the integer-precision image data obtained by the decoding is transformed into floating point-precision image data.

EFFECTS OF THE INVENTION

According to the present technology, it is possible to process images. Also according to the present technology, it is possible to suppress increase in the load of encoding and decoding floating point-precision image data.

BRIEF DESCRIPTION OF DRAWINGS

FIG. 6 is a diagram illustrating an example of a parameter group defined in Reader Requirements Box.

FIG. 8 is a diagram illustrating an example of values and definitions of Pixel Format.

FIG. 9 is a diagram illustrating an example of values and definitions of Pixel Format.

FIG. 11 is a diagram illustrating an example of parameter definition of an extended marker segment.

FIG. 12 is a diagram illustrating an example of definitions of floating point-precision transform equations.

MODE FOR CARRYING OUT THE INVENTION

Figure 1:
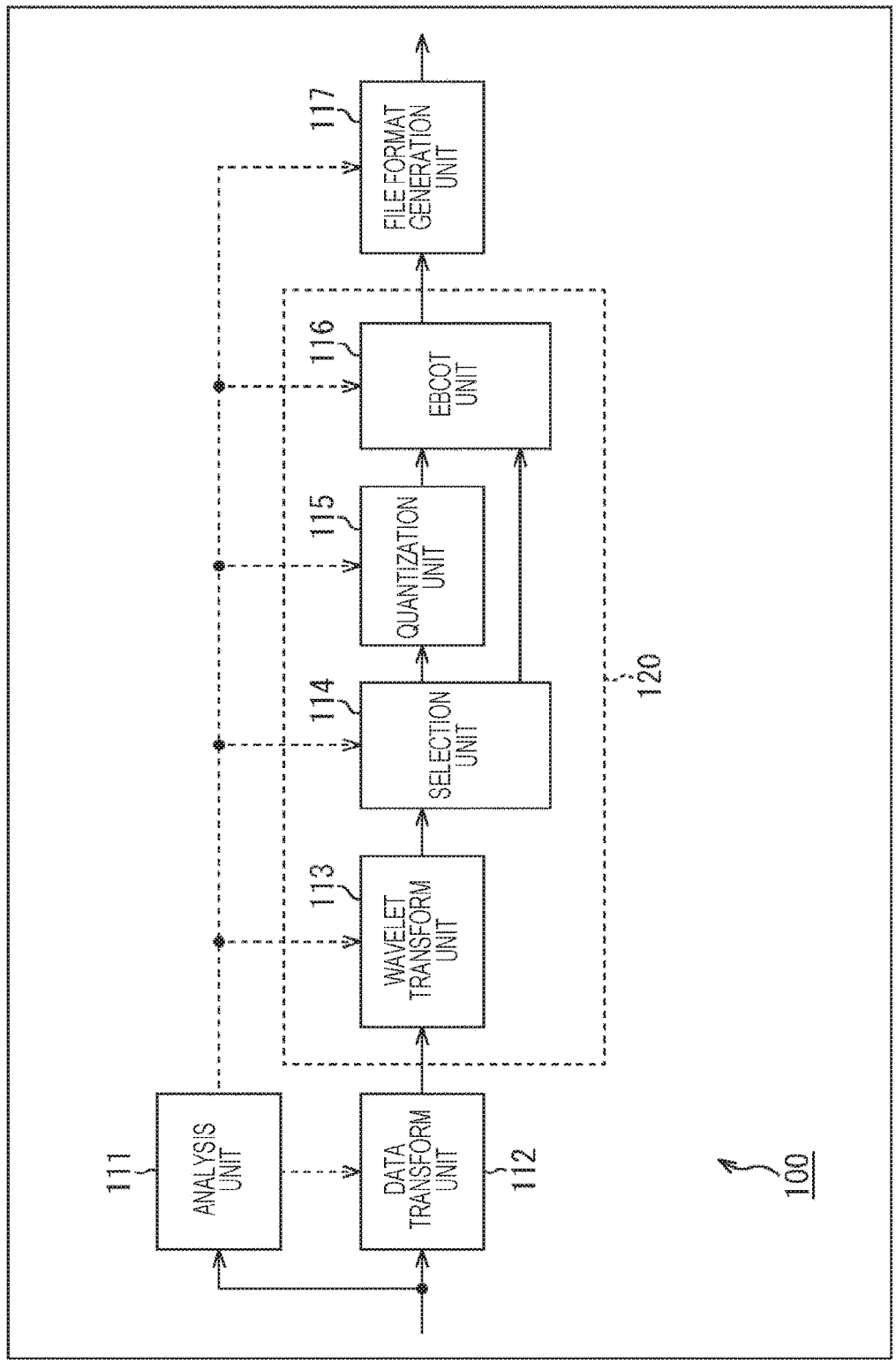
FIG. 1 is a block diagram of a main configuration example of an image encoding apparatus.

Modes for carrying out the present disclosure (hereinafter, called embodiments) will be explained below. Note that the explanations will be given in the following order:
  1. First embodiment (image encoding apparatus)
  2. Second embodiment (image decoding apparatus)
  3. Third embodiment (image encoding apparatus)
  4. Fourth embodiment (image decoding apparatus)
  5. Fifth embodiment (image encoding apparatus)
  6. Sixth embodiment (image decoding apparatus)
  7. Seventh embodiment (computer)

<1. First Embodiment>
<Encoding of Floating Point-precision Image Data>

Conventionally, when a subject image includes a bright part and a dark part, the bright part may have a phenomenon such as whiteout and the dark part may have a phenomenon such as black crushing. To prevent these phenomena, a plurality of multi-exposed images may be composited to create an image covering the bright part and the dark part. However, this method expands the dynamic range (high dynamic range). This requires a higher bit depth to represent the image, and the image data need to be changed from the conventional integer precision to the floating point precision.

For floating point-precision data representation, the IEEE 754-type floating point precision as an international standard is frequently used.

For example, the maximum absolute value of integer-precision representation of 32 bits (single precision) is 232. Meanwhile, the absolute value of floating point-precision representation is known to be extendable up to 2127 or the like. Therefore, the floating point-precision data can be represented in a very wide range and is suited to representation of high-dynamic range images. However, subjecting the data to image processing such as encoding may cause an overflow of operational precision due to its large data length.

For example, the actual floating point-precision data range is $2^{-24}$ to $2^{-14}$ in the case of denormalized representation with half-precision (16 bits), and $2^{-14}$ to 65.504 in the case of normalized representation with half-precision (16 bits). In addition, for example, the data range is $±2^{-149}$ to $(1-2^{-23})×2-126$ in the case of denormalized representation with single precision (32 bits), and $±2^{-126}$ to $(2-2^{-23})×2^{127}$ in the case of normalized representation with single precision (32 bits). Further, for example, the data range is $±2^{-1074}$ to $(1-2^{-52})×2^{-1022}$ in the case of denormalized representation with double precision (64 bits), and $±2^{-1022}$ to $(2-2^{-52})×2^{1023}$ in the case of normalized representation with double precision (64 bits). The normalized representation is used to handle general image data and the like, and the denormalized representation is used to represent extremely small values.

As described above, the floating point-precision data range is very wide, but when the floating point-precision data is subjected to lossless encoding, no data loss is permitted to ensure reversibility. This requires data length equal to or larger than the bit depth with absolute value of floating point precision. Therefore, the processing load of encoding and decoding increases to raise the possibility of an overflow. In other words, preventing such an overflow may result in extremely high hardware costs.

Accordingly, an image processing apparatus that encodes floating point-precision image data composed of a sign, an exponent, and a mantissa includes a data transform unit that transforms the floating point-precision image data into integer-precision image data and an encoding unit that encodes the integer-precision image data obtained through the conversion by the data transform unit. Specifically, to code the floating point-precision image data composed of a sign, an exponent, and a mantissa, the floating point-precision image data composed of a sign, an exponent, and a mantissa is transformed into the integer-precision image data, and the integer-precision image data obtained by the transformation is encoded.

This allows integer-precision encoding and suppresses the expansion of a data range. Accordingly, it is possible to suppress increase in the data length and the load of encoding the floating point-precision image data. Therefore, it is possible to suppress the occurrence of an overflow and suppress increase in hardware costs.

Incidentally, fixed point-precision image data can be processed in a manner similar to the integer-precision image data and descriptions thereof will be omitted. In the following description, only the integer-precision image data and the floating point-precision image data will be explained.

<Image Encoding Apparatus>

FIG. 1 is a block diagram of a main configuration example of an image encoding apparatus as an embodiment of an image processing apparatus to which the present technology is applied. An image encoding apparatus 100 illustrated in FIG. 1 encodes input floating point-precision image data and outputs the encoded data (code stream).

As illustrated in FIG. 1, the image encoding apparatus 100 has an analysis unit 111, a data transform unit 112, a wavelet transformation unit 113, a selection unit 114, a quantization unit 115, an embedded block coding with optimized truncation (EBCOT) unit 116, and a file format generation unit 117.

The analysis unit 111 analyzes the input image data and determines whether the image data is of floating point precision. The analysis unit 111 controls the operations of the data transform unit 112 to the file format generation unit 117 on the basis of the determination result.

When the input image data is determined as being of floating point precision on the basis of the result of analysis by the analysis unit 111 (determination result), the data transform unit 112 transforms the floating point-precision image data into the integer-precision image data. The data transformation will be described later in detail. The data transform unit 112 supplies the integer-precision image data after the transformation to the wavelet transformation unit 113. Note that when the input image data is of integer precision, the data transform unit 112 omits data transformation and supplies the integer-precision image data as it is to the wavelet transformation unit 113.

The wavelet transformation unit 113 performs wavelet transformation on the supplied integer-precision image data. The wavelet transformation unit 113 performs a process of filtering the integer-precision image data with analysis filters to generate coefficient data of low-frequency components and high-frequency components, and repeats that process recursively on the generated coefficient data of low-frequency components. The wavelet transformation unit 113 has a horizontal analysis filter and a vertical analysis filter as the analysis filters, and performs the filtering process as described above both in the screen horizontal direction and the screen vertical direction. The wavelet transformation unit 113 repeats the filtering process a predetermined number of times. When the decomposition level reaches a predetermined level, the wavelet transformation unit 113 supplies the hierarchized coefficient data to the selection unit 114.

Note that the kind of the filters used by the wavelet transformation unit 113 can be arbitrarily set. For example, the wavelet transformation unit 113 may use 5/3 filters or 9/7 filters. In addition, the wavelet transformation unit 113 may use 5/3 filters for lossless encoding and may use 9/7 filters for lossy encoding, for example.

The selection unit 114 selects the supply destination of the coefficient data. In the case of performing lossy encoding, the selection unit 114 supplies the coefficient data to the quantization unit 115. In addition, in the case of performing lossless encoding, the selection unit 114 supplies the coefficient data to the EBCOT unit 116. That is, in this case, the quantization process is omitted.

Whether to perform lossless encoding or lossy encoding may be decided on the basis of arbitrary information. For example, whether to perform lossless encoding or lossy encoding may be preset by the user or the like or may be decided as appropriate depending on the image data, the processing load, or the like. Alternatively, the image encoding apparatus 100 may be capable of performing only either lossless encoding or lossy encoding. In that case, the selection unit 114 can be omitted (the quantization unit 115 can also be omitted in the case of lossless encoding).

The quantization unit 115 quantizes the coefficient data supplied by the selection unit 114 and supplies the same to the EBCOT unit 116.

The EBCOT unit 116 subjects the coefficient data supplied by the selection unit 114 or the quantization unit 115 to entropy encoding to generate encoded data. The EBCOT unit 116 supplies the generated encoded data to the file format generation unit 117.

The file format generation unit 117 uses the supplied encoded data to generate a file conforming to joint photographic experts group (JPEG) 2000 standards (JPEG2000 file) in accordance with the analysis result (determination result) of the analysis unit 111. For example, when the analysis unit 111 determines that the image data input into the image encoding apparatus 100 is of floating point precision, the file format generation unit 117 generates additional information indicative of that and adds the same to the JPEG2000 file including the encoded data supplied by the EBCOT unit 116. The JPEG2000 file and the additional information will be described later in detail.

The file format generation unit 117 outputs the generated file to the outside of the image encoding apparatus 100.

As illustrated in FIG. 1, the wavelet transformation unit 113 to the EBCOT unit 116 may be collectively set as an encoding unit 120. The configuration of the wavelet transformation unit 113 to the EBCOT unit 116 described above is a configuration example in the case where the image encoding apparatus 100 encodes the image data by the JPEG2000 method. For example, when the input image data is a natural image, high compression ratio can be achieved by applying the JPEG2000 method as in the example of FIG. 1.

However, the encoding method of the image encoding apparatus 100 can be arbitrarily set and is not limited to JPEG2000. That is, the internal configuration of the encoding unit 120 can be arbitrarily set and is not limited to the example of FIG. 1. More suitable components are desirably used depending on the type and feature of the image.

<Floating Point-precision Image Data>

The floating point-precision data value is represented by a sign (S), an exponent (E), and a mantissa (M) in an IEEE754 format. The 16-bit half-precision floating point is a format developed by Industrial Light & Magic, Ltd. and is characterized by supporting high dynamic ranges while requiring lower costs for hard discs and memories. The single-precision floating point format is used in several computer graphics environments such as OpenEXR, OpenGL, and D3DX, for example.

Figure 2:
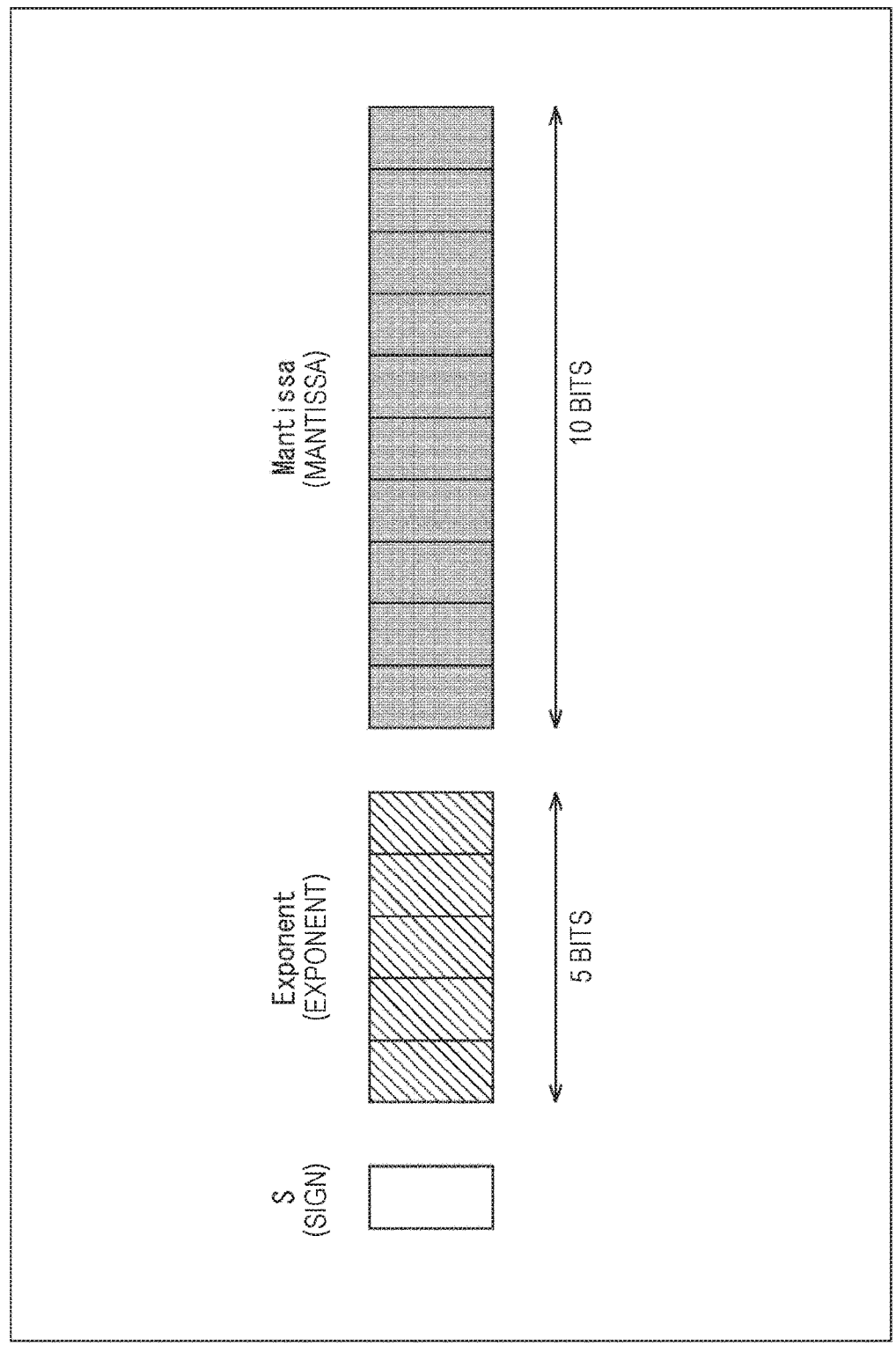
FIG. 2 is a diagram describing an example of format of floating point-precision image data.

Among them, OpenEXR is frequently used as a de facto format for recent high-dynamic range images. As illustrated in FIG. 2, the format is composed of a sign (S) of 1 bit, an exponent of 5 bits, and a mantissa of 10 bits.

In the image encoding apparatus 100, the three data are handled as integer values. For example, the data transform unit 112 may transform the three data of sign (S), exponent (E), and mantissa (M) into integer-precision image data with the total of bit depths assigned thereto. That is, the data transform unit 112 may transform the floating point-precision image data composed of a sign, an exponent, and a mantissa into one integer-precision data in which sign data, exponent data, and mantissa data are aligned in this order from the MSB to the LSB for the individual pixels.

Figure 3:
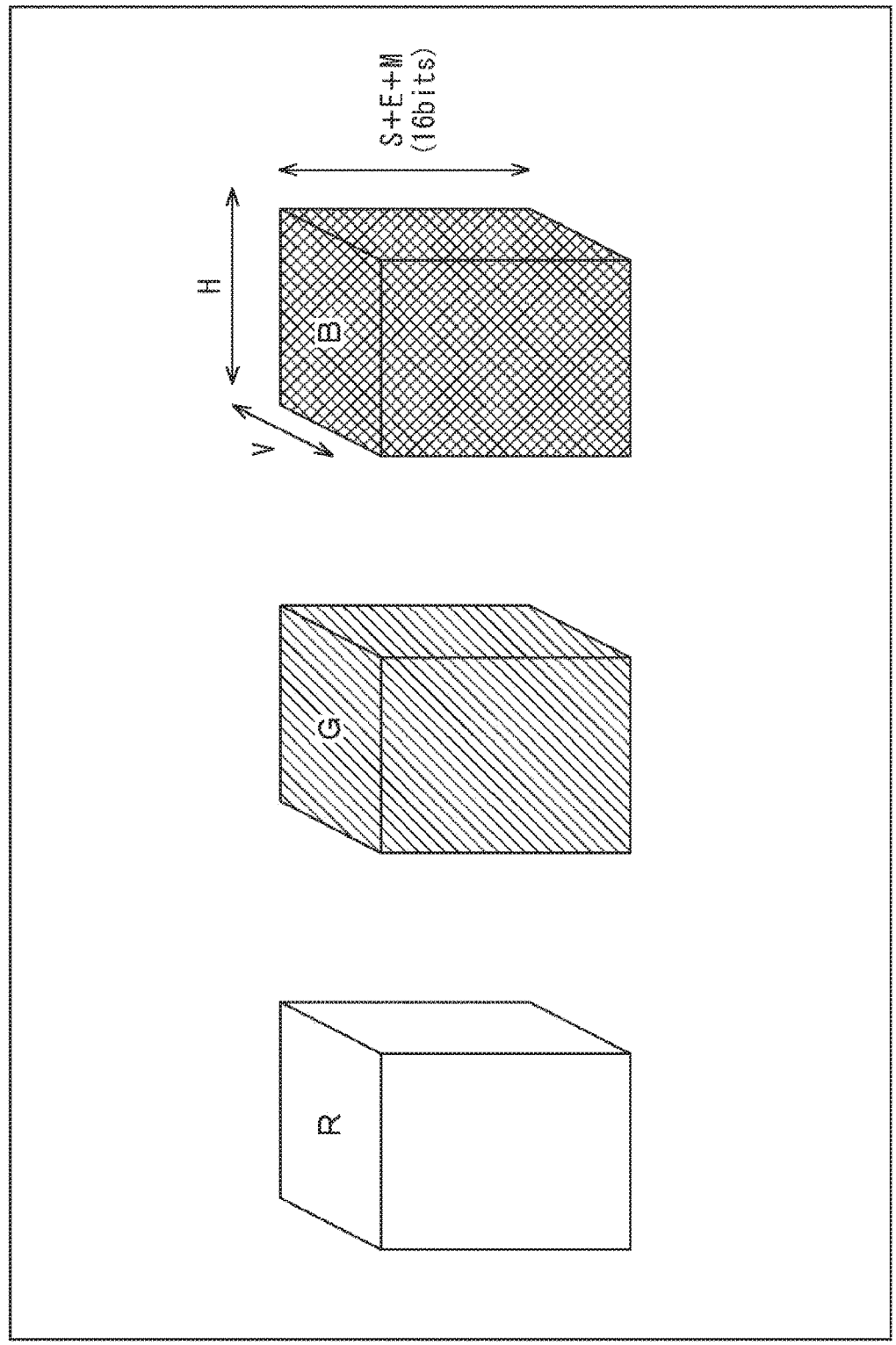
FIG. 3 is a diagram illustrating a configuration example of components.

This case is equivalent to encoding integer data with a total 16-bit length per pixel. When the encoding unit 120 performs lossless compression, all the three values of sign (S), exponent (E), and mantissa (M) are guaranteed. That is, in this case, when the input image data with a horizontal H×vertical V resolution is composed of three components of RGB, the three components of the image data with a 16-bit depth (all the resolutions are horizontal H×vertical V=HV) are encoded as illustrated in FIG. 3.

In addition, the data transform unit 112 may transform the three data of sign (S), exponent (E), mantissa (M) into respective integer-precision image data. Specifically, the data transform unit 112 may transform the floating point-precision image data composed of a sign, an exponent, and a mantissa into three integer-precision image data in which the sign data, the exponent data, and the mantissa data are independent from one another for the individual pixels.

Figure 4:
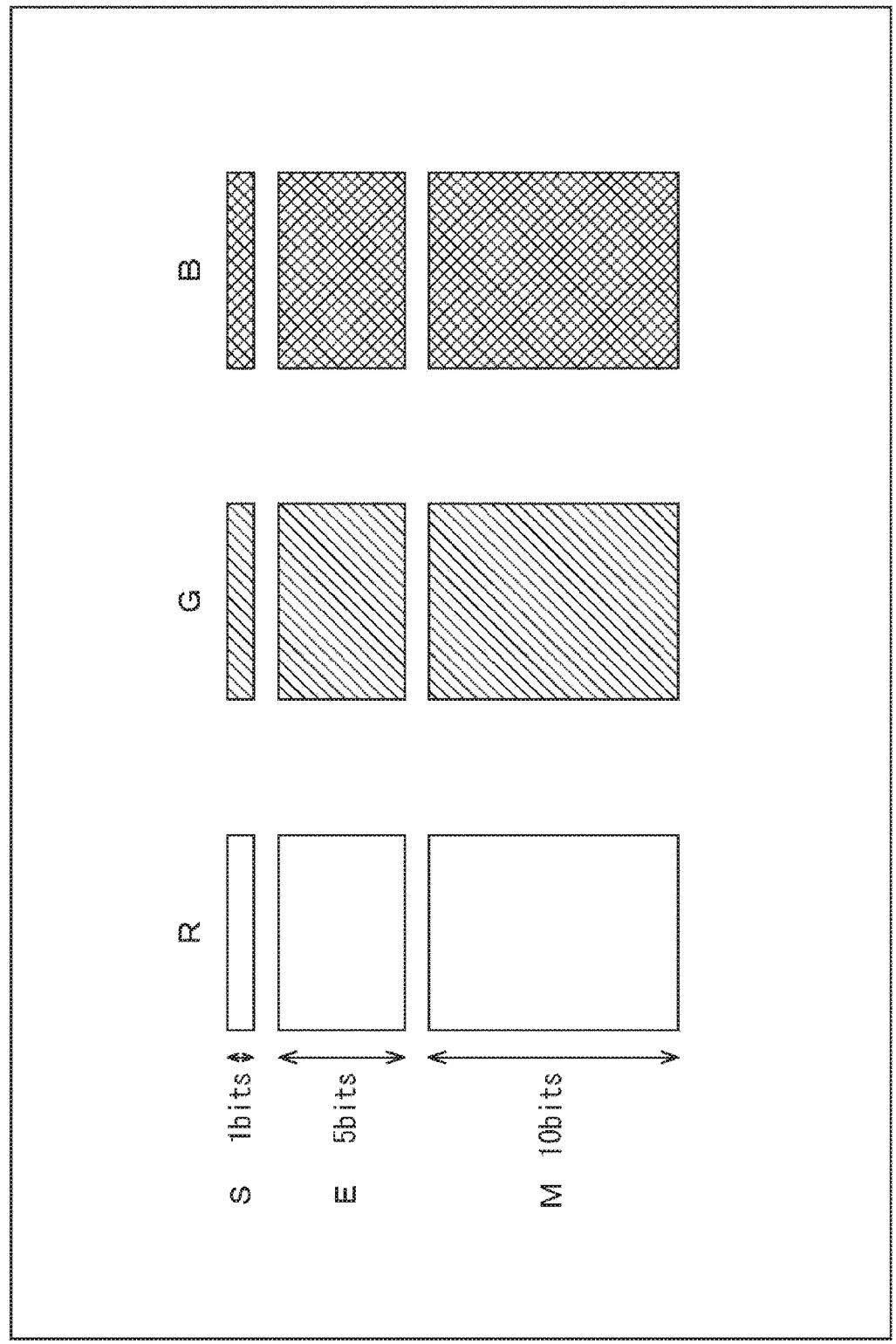
FIG. 4 is a diagram illustrating a configuration example of components.

In this case, as illustrated in FIG. 4, the input data is divided into a 1-bit image of sign (S), a 5-bit image of exponent (E), and a 10-bit image of mantissa (M) by the data transformation by the data transform unit 112. The encoding unit 120 encodes these images individually. That is, when the input data of a horizontal H×vertical V resolution is composed of three components of RGB, the three components×three images=nine images (all the resolutions are horizontal H×vertical V=HV) are encoded.

Incidentally, the sign (S) is highly correlative among the pixels. That is, the value of the sign (S) does not change among the pixel data in many cases. Accordingly, only the leading pixel (to be first processed) of a picture in the sign (S) may be encoded, and the encoding of the subsequent pixels in the sign (S) may be omitted. In that case, for decoding, the value of the sign (S) for the leading pixel of the picture can be applied to the values of the sign (S) for the other pixels of the picture.

Specifically, the data transform unit 112 may transform the sign data, the exponent data, and the mantissa data for the leading pixels of pictures of the image data into three independent integer-precision image data, and may transform the exponent data and the mantissa data for the other pixels to two independent integer-precision image data. Accordingly, it is possible to improve the encoding efficiency (suppress increase in the amount of encoding due to sign (S)).

In addition, in the foregoing description, the components of RGB are individually encoded. However, the encoding method is not limited to this but differential data between the components may be encoded, for example. Specifically, the data transform unit 112 may transform the floating point-precision image data into the integer-precision image data and further transform the same into the differential data between the components for the individual pixels. In that case, the encoding unit 120 encodes the differential data obtained through transformation by the data transform unit 112.

For example, X, Y, X', and Y' may be defined as in the following equations (1) to (4) and encoded:

$$X=(G-B)/2 \qquad (1)$$

$$Y=(G+B)/2 \qquad (2)$$

$$X'=(G-R)/2 \qquad (3)$$

$$Y'=(G+R)/2 \qquad (4)$$

In addition, for example, X and Y may be defined as in the foregoing equations (1) and (2), and X, Y and R may be encoded. That is, differential data may be generated from only some of the components. As a matter of course, the method of generating the differential data (the combination of components and the like) is not limited to the foregoing example but can be arbitrarily set. For instance, in the foregoing example, the differential data is determined with respect to G. Alternatively, the differential data may be determined with reference to B or R. In addition, for instance, the equations for determining the differential data may be different from the foregoing example. Further, the components may be different from RGB.

<File Format>

Figure 5:
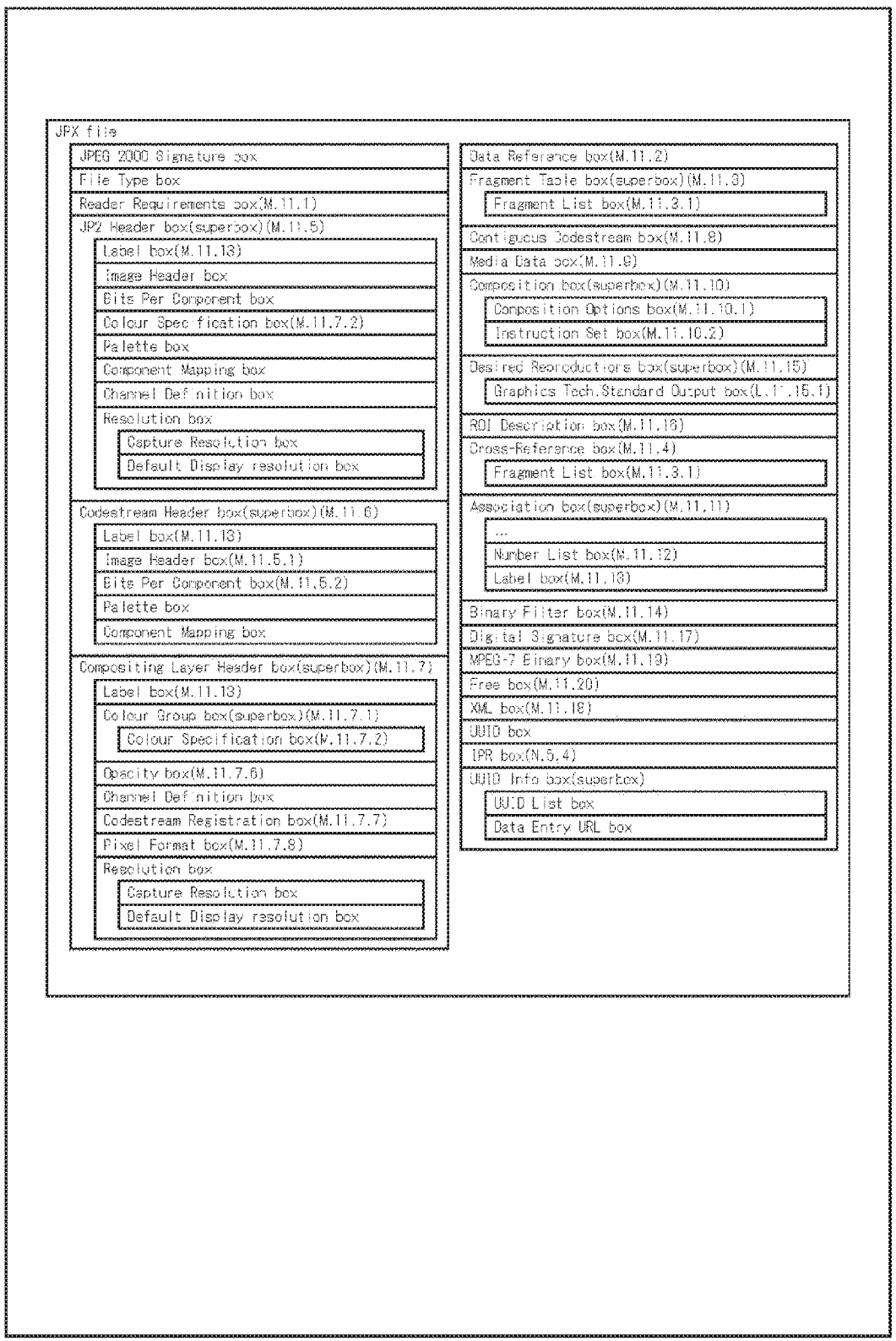
FIG. 5 is a diagram illustrating a configuration example of a JPX file format.
Figure 15:
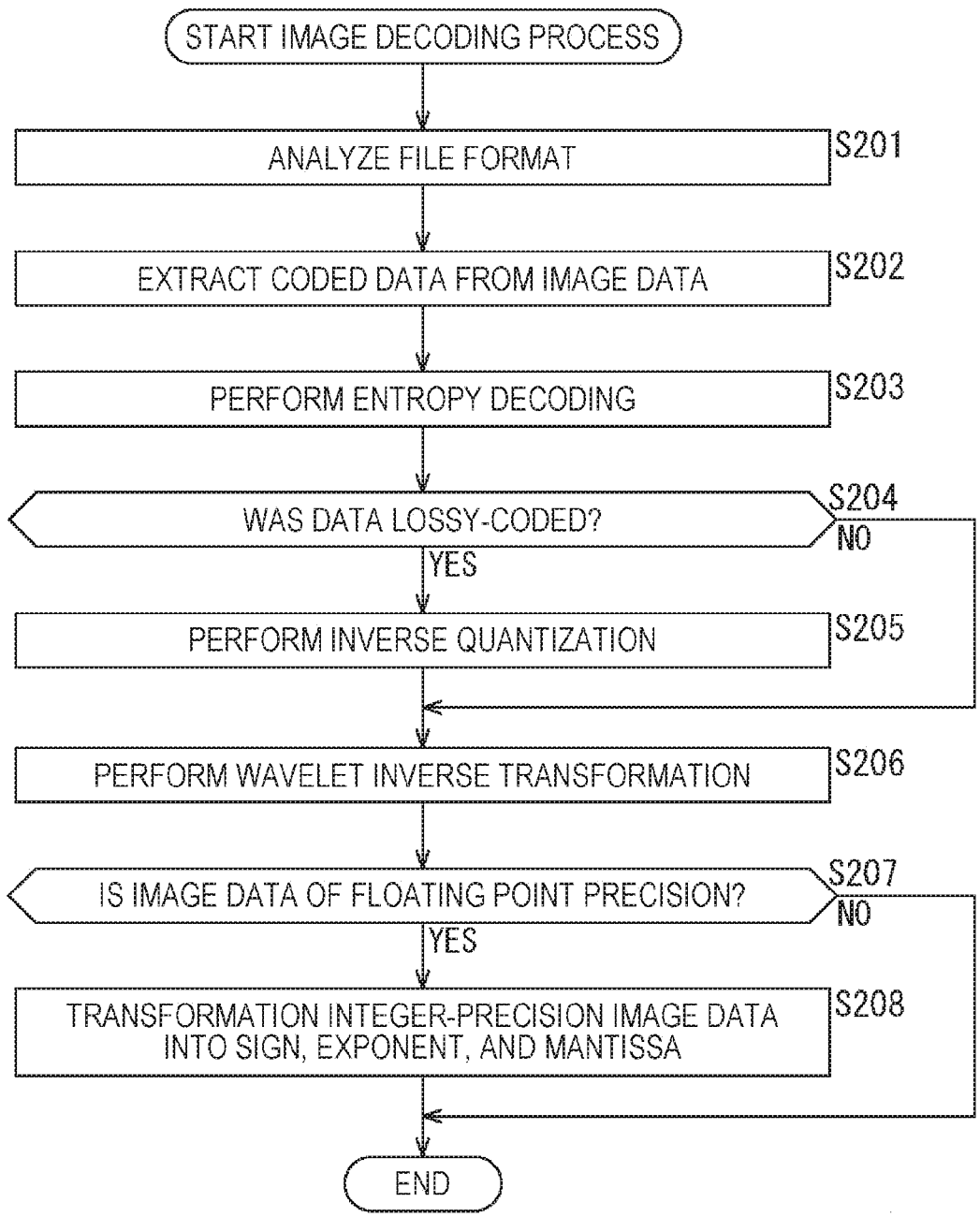
FIG. 15 is a flowchart of an example of an image decoding process.

Next, the additional information will be explained. JPEG2000 is a compression codec technique but has many functions and allows the additional information to be filed together with the encoded result. FIG. 5 is a configuration diagram of a JPEG2000 extended file format (JPX). As illustrated in FIG. 15, the JPX file format is composed of individual box structures. The encoded data generated by the EBCOT unit 116 is stored in Continuous Codestream box (M.11.8).

In JPEG2000 Part 1, the input image is basically set to be an integer-precision image. Accordingly, when a floating point-precision image is input, it is efficient to define the image in the JPX file format.

In Reader Requirements box (M.11.1) of FIG. 5, it is possible to define the format of the input image, for example, anyone of integer precision, fixed point precision, and floating point precision. Therefore, when the format of the input image is of floating point precision, a parameter indicative of floating point precision may be defined in this box.

FIG. 6 is a diagram representing an example of a parameter group defined in Reader Requirements box. In the parameter group, the value of 80 defines that the image data is of fixed point precision, the value of 81 defines that the image data is of floating point precision, the value of 82 defines that the image data uses a mantissa and an exponent. Therefore, when the input image data is of floating point precision and uses a sign (S), an exponent (E), and a mantissa (M) as in OpenEXR as described above, the value of 82 can be selected.

Figure 7:
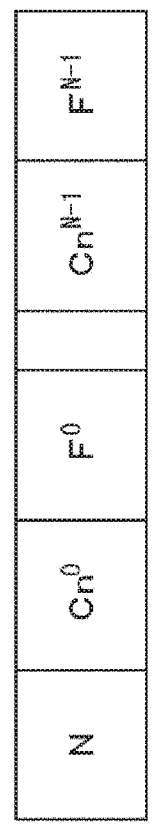
FIG. 7 is a diagram illustrating a configuration example of Pixel Format box.

In addition, as an extended format, Pixel Format box (M11.7.8) may be defined as described in FIG. 7. In Pixel Format box, $F^{N-1}$ is a parameter that actually defines the precision of image data in a pixel format (N denotes the number of components and N=3 in the case of RGB). FIG. 8 describes the values of the pixel format (F) and their definitions. In the case of floating point precision, for example, 0100 mmmm mmmm mmmm is selected. Further, in the case of floating point precision in conformity with IEC 60559 (equal to IEEE 754), any one of half-precision (0100 0000 0000 1010), single precision (0100 0000 00010111), and double precision (0100 0000 0011 0100) is selected as described in FIG. 9.

Figure 10:
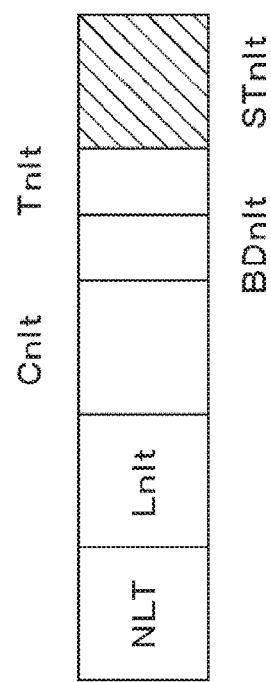
FIG. 10 is a diagram illustrating an example of a marker segment in the case of performing non-linear transformation.

FIG. 10 illustrates a marker segment for use in the case of applying non-linearity point transformation to components. Tnlt denotes no-linearity type, and only the values of Tnlt=1 and 2 are defined in the existing format. In addition, STnlt denotes a parameter group that is defined in conjunction with Tnlt.

FIG. 11 describes parameter definitions by Tnlt (non-linearity type) in the extended marker segment Non-linearity Point Transformation (NLT). Gamma-style non-linearity transformation and LUT-style non-linearity transformation are already defined. Therefore, the floating point-precision transform equation is newly defined and added to this table. Specifically, Integer-float transformation is defined with the value of 0000 0011, and the specific transform equation is specified in the table described in FIG. 12.

FIG. 12 describes the specific transform equations with Tnlt=3 for transformation into floating point precision from half precision, single precision, and double precision. Incidentally, which of the half-precision type, the single-precision type, and the double-precision type to be selected is defined by the parameter defined in Reader Requirements box described above, and therefore the value of h can be calculated according to the transform equation defined by the values.

As described above, the image encoding apparatus 100 transforms the floating point-precision image data into the integer-precision image data and encodes the same, thereby making it possible to suppress increase in the data length and load. In the case of lossless encoding in particular, it is possible to further suppress increase in the data length and load. In addition, in the case of lossy encoding, by suppressing the expansion of data length, it is possible to suppress reduction in the amount of information due to discarding, quantization, and the like and suppress reduction in image quality of the decoded image.

In addition, as described above, adding the information on the precision of the image data as additional information to the encoded data makes it easier to grasp the necessity of data transform at the time of decoding and the method thereof, and the like. That is, it is also possible to reduce the load of the decoding process.

Note that the method of adding the information on the precision of the image data can be arbitrarily set. For example, the additional information may be stored in any position of the file. In addition, the encoded data and the additional information may be individually filed and associated with each other. Further, the additional information may be stored in lower bits of the image data and then encoded.

<Flow of an Image Encoding Process>

Figure 13:
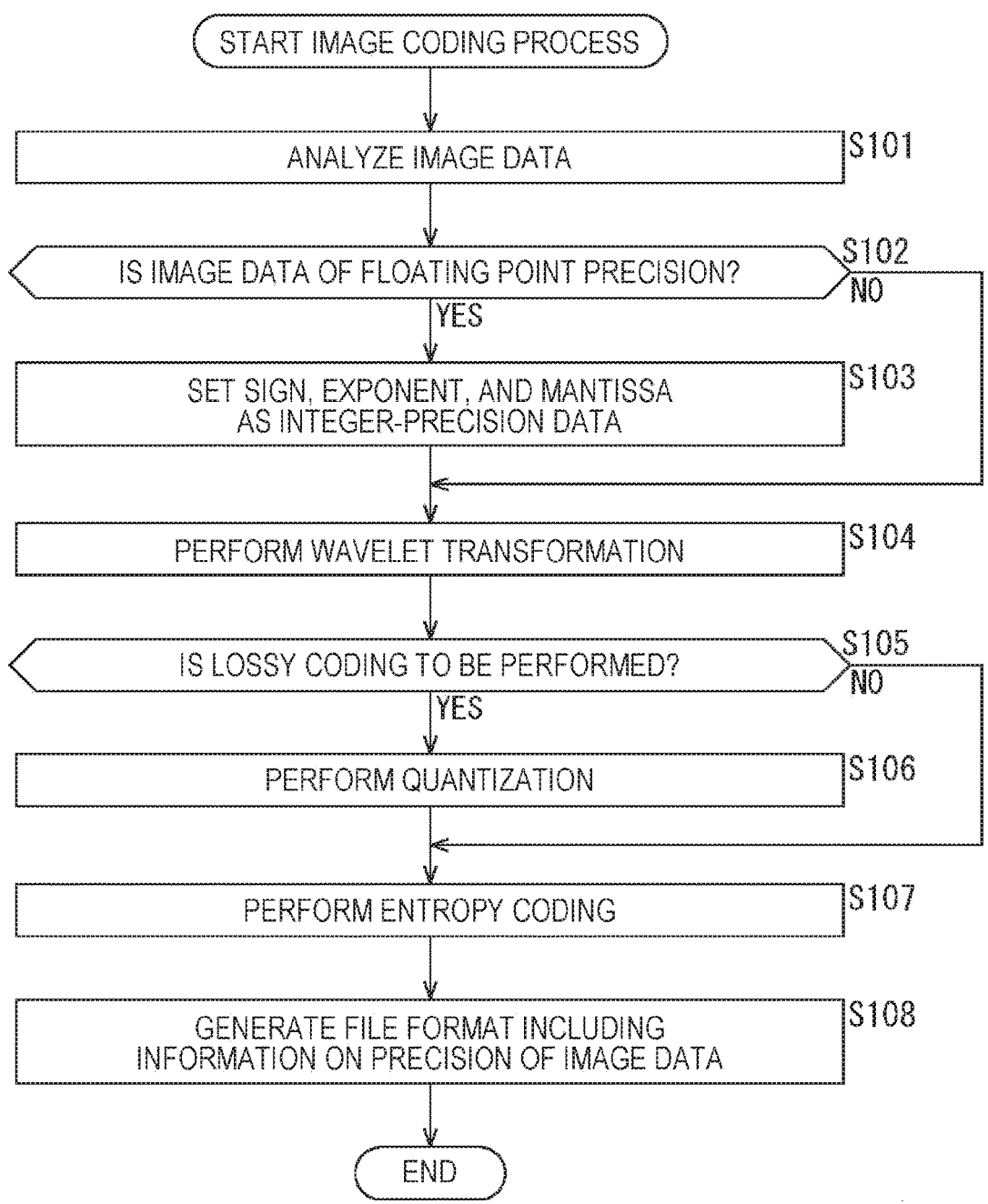
FIG. 13 is a flowchart of an example of an image encoding process.

With reference to the flowchart of FIG. 13, an example of flow of an image encoding process by the image encoding apparatus 100 illustrated in FIG. 1 will be explained. When image data is input, the image encoding process is started.

The analysis unit 111 analyzes the input image data at step S101, and determines whether the image data is of floating point precision at step S102. When it is determined that the floating point-precision image data is input, the process moves to step S103.

At step S103, the data transform unit 112 transforms the sign, the exponent, and the mantissa of the floating point-precision image data into integer-precision image data as described above. Upon completion of the transformation, the process moves to step S104. Meanwhile, when it is determined at step S102 that the input image is of integer precision, the process moves to step S104.

At step S104, the wavelet transformation unit 113 performs wavelet transformation on the image data.

At step S105, the selection unit 114 determines whether to encode the image data by the lossy method. When it is determined to perform lossy encoding, the process moves to step S106.

At step S106, the quantization unit 115 quantizes the coefficient data of the image data having been subjected to wavelet transformation. Upon completion of the quantization, the process moves to step S107. Meanwhile, when it is determined at step S105 to perform lossless encoding, the process moves to step S107.

At step S107, the EBCOT unit 116 subjects the coefficient data (or the quantized coefficient data) to entropy encoding.

At step S108, the file format generation unit 117 generates a file format including the information on the precision of the image data.

Upon completion of step S108, the image encoding process is terminated.

By performing the steps as described above, it is possible to suppress increase in the load of encoding and decoding the floating point-precision image data.

<2. Second Embodiment>
<Decoding of the Floating Point-precision Image Data>

Next, decoding of the encoded data (code stream) generated by the image encoding apparatus 100 explained above in relation to the first embodiment will be explained.

If the floating point-precision image data is directly lossless-encoded, no data loss is permitted to guarantee reversibility. Therefore, the data length equal to or larger than the bit depth of absolute value of floating point precision is required. Accordingly, the load of the decoding process may increase to cause an overflow. In other words, this may lead to extremely high hardware costs to avoid the occurrence of an overflow.

Accordingly, the image processing apparatus includes a decoding unit that decodes the encoded data of the integer-precision image data obtained by transforming the floating point-precision image data composed of a sign, an exponent, and a mantissa, and a data transform unit that transforms the integer-precision image data obtained through decoding by the decoding unit into the floating point-precision image data. That is, the encoded data of the integer-precision image data obtained by transforming the floating point-precision image data composed of a sign, an exponent, and a mantissa is decoded, and the integer-precision image data obtained by decoding is transformed into the floating point-precision image data.

This allows integer-precision encoding and suppresses the extension of a data range. Accordingly, it is possible to suppress increase in the data length and the load of decoding process for obtaining the floating point-precision image data. Therefore, it is possible to suppress the occurrence of an overflow and increase in hardware costs.

Note that, in a manner similar to the first embodiment, the fixed point-precision image data can be processed in a manner similar to the integer-precision image data, and descriptions thereof will be omitted. In the following description, only the case where the image data is of integer precision and the case where the image data is of floating point precision will be explained.

<Image Decoding Apparatus>

Figure 14:
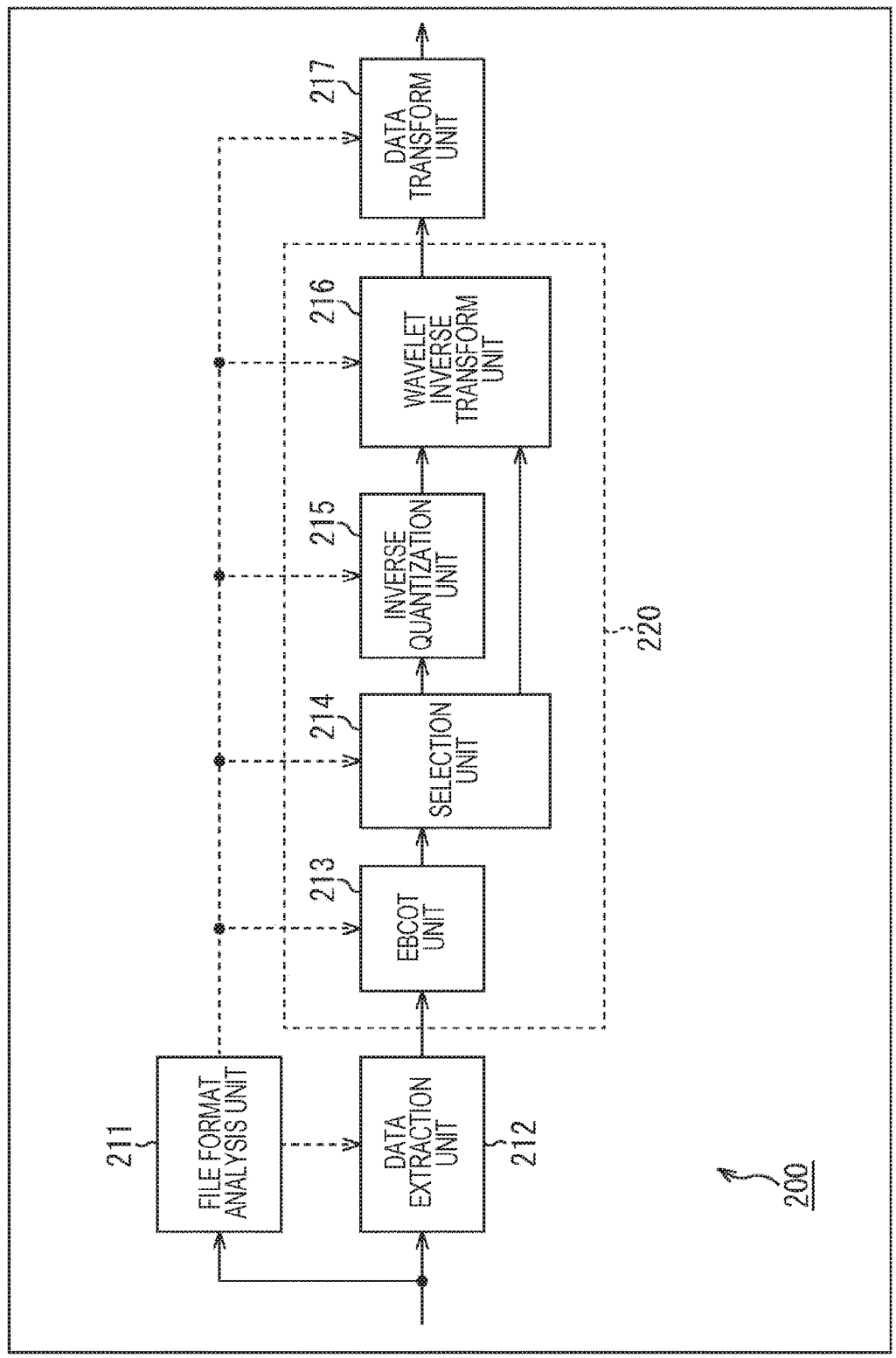
FIG. 14 is a block diagram of a main configuration example of an image decoding apparatus.

FIG. 14 is a block diagram of a main configuration example of an image decoding apparatus as another embodiment of an image processing apparatus to which the present technology is applied. An image decoding apparatus 200 illustrated in FIG. 14 decodes the encoded data (code stream) generated by the image encoding apparatus 100 to obtain the decoded image. The file generated by the image encoding apparatus 100 (the encoded data (code stream)) is transmitted to the image decoding apparatus 200 via an arbitrary communication medium or is recorded in an arbitrary recording medium and read from the recording medium by the image decoding apparatus 200.

The image decoding apparatus 200 subjects the integer-precision image data obtained by decoding to data transformation, and outputs the floating point-precision image data.

As illustrated in FIG. 14, the image decoding apparatus 200 has a file format analysis unit 211, a data extraction unit 212, an EBCOT unit 213, a selection unit 214, an inverse quantization unit 215, a wavelet inverse transform unit 216, and a data transform unit 217.

The file format analysis unit 211 analyzes the file format of the input file (including the encoded data (code stream)), and determines from the additional information whether the image data before encoding was of floating point precision. The file format analysis unit 211 controls the operations of the data extraction unit 212 to the data transform unit 217 on the basis of the determination result.

For example, the input file is a JPEG2000 file, the image data is encoded by the JPEG2000 method, and the information on the precision of the image data is stored in the JPX file format as explained above with reference to FIGS. 5 to 12. The file format analysis unit 211 refers to the various kinds of information stored in predetermined positions of the JPX file format as described above to determine whether the image data before encoding was of floating point precision.

The data extraction unit 212 extracts the encoded data (code stream) from the input file on the basis of the result of analysis by the file format analysis unit 211 and the like, and supplies the same to the EBCOT unit 213.

The EBCOT unit 213 subjects the encoded data supplied by the data extraction unit 212 to entropy decoding by a method corresponding to the entropy encoding by the EBCOT unit 116, on the basis of the result of analysis by the file format analysis unit 211 and the like. The EBCOT unit 213 supplies coefficient data obtained by the entropy decoding to the selection unit 214.

The selection unit 214 selects the destination of supply of the coefficient data on the basis of the result of analysis by the file format analysis unit 211 and the like. When lossy encoding was performed by the image encoding apparatus 100, that is, when lossy decoding is to be performed, the selection unit 214 supplies the coefficient data to the inverse quantization unit 215. Meanwhile, when lossless encoding was performed by the image encoding apparatus 100, that is, when lossless decoding is to be performed, the selection unit 214 supplies the coefficient data to the wavelet inverse transform unit 216. That is, in this case, the inverse quantization process is omitted.

Alternatively, the image decoding apparatus 200 may be capable of performing only either lossless decoding or lossy decoding. In that case, the selection unit 214 can be omitted (the inverse quantization unit 215 can also be omitted in the case of lossless decoding).

The inverse quantization unit 215 subjects the quantized coefficient data supplied by the selection unit 214 to inverse quantization by a method corresponding to the quantization performed by the quantization unit 115, on the basis of the result of analysis by the file format analysis unit 211 and the like. The inverse quantization unit 215 supplies the inverse-quantized coefficient data to the wavelet inverse transform unit 216.

The wavelet inverse transform unit 216 subjects the coefficient data supplied by the selection unit 214 or the inverse quantization unit 215 to wavelet inverse transform by a method corresponding to the wavelet transformation performed by the wavelet transformation unit 113 on the basis of the result of analysis by the file format analysis unit 211 and the like. Accordingly, the integer-precision image data can be obtained.

When the image data before encoding is determined to be of floating point precision on the basis of the result of analysis by the file format analysis unit 211 and the like, the data transform unit 217 transforms the integer-precision image data into the floating point-precision image data. That is, the data transform unit 217 generates data of sign (S), data of exponent (E), and data of mantissa (M) from the integer-precision image data.

For example, when the integer-precision image data supplied by the wavelet inverse transform unit 216 is integer-precision image data with the total of bit depths assigned to the three data of sign (S), exponent (E), and mantissa (M) explained above with reference to FIG. 3, for example, the data transform unit 217 divides the integer-precision image data by the numbers of bits of sign (S), exponent (E), and mantissa (M) and transforms the integer-precision image data into the three data of sign (S), exponent (E), and mantissa (M). For example, in the case of FIG. 2, the data transform unit 217 divides the 16-bit integer-precision image data into first 1 bit as the data of sign (S), the next 5 bits as the data of exponent (E), and the remaining 10 bits as the data of mantissa (M), from the MSB to the LSB.

In this manner, the data transform unit 217 may separate the integer-precision image data into three data by the number of bits, and set the three data as the data of sign (S), the data of exponent (E), and the data of mantissa (M) from the MSB to the LSB.

In addition, when the integer-precision image data supplied by the wavelet inverse transform unit 216 is formed by transforming the three data of sign (S), exponent (E), and mantissa (M) into the three integer-precision image data as explained above with reference to FIG. 4, the data transform unit 217 sets the three integer-precision image data as the data of sign (S), the data of exponent (E), and data of mantissa (M). That is, the data transform unit 217 may set the integer-precision image data as any one of the data of sign, the data of exponent, and the data of mantissa.

Criterion for determining to set the integer-precision image data as the data of sign, the data of exponent, or the data of mantissa can be set arbitrarily. For example, the determination may be made on the basis of the data length such that the data of sign (S) is set when the data length is 1 bit, the data of exponent (E) is set when the data length is 5 bits, and the data of mantissa (M) is set when the data length is 10 bits, or the like. Alternatively, for example, the determination may be made according to the data alignment (sequence) such that the initial image data is set as the data of sign (S), the next image data is set as the data of exponent (E), the still next image data is set as the data of mantissa (M), and the still next image data is set as the data of sign (S), or the like.

Further, for example, when the integer-precision image data supplied by the wavelet inverse transform unit 216 is formed by transforming the data of sign, the data of exponent, and the data of mantissa for the leading pixels of pictures of the image data into the three independent integer-precision image data and then transforming the data of exponent and the data of mantissa for the other pixels into the two independent integer-precision image data, the data transform unit 217 sets the three integer-precision image data as the data of sign (S), the data of exponent (E), and the data of mantissa (M) for the leading pixels of the pictures, and sets the two integer-precision image data for the other pixels as the data of exponent (E) and the data of mantissa (M).

Specifically, the data transform unit 217 may set the integer-precision image data as any one of the data of sign, the data of exponent, and the data of mantissa for the leading pixels of pictures of the image data according to the sequence, the data length, or the like, and may set the integer-precision image data as the data of exponent or the data of mantissa for the other pixels according to the sequence, the data length, or the like.

Also in this case, the criterion for determining whether to set the integer-precision image data as the data of sign, the data of exponent, or the data of mantissa can be set arbitrarily. For example, the determination may be made on the basis of the data length or the data alignment (sequence).

In addition, for example, when the integer-precision image data supplied by the wavelet inverse transform unit 216 is differential data between the components, the data transform unit 217 determines the individual component data from the differential data and transforms the individual component data into floating point precision.

For example, as explained above in relation to the first embodiment, when X, Y, X', and Y' for the image data of RGB components are defined as in the foregoing equations (1) to (4) and are encoded, the wavelet inverse transform unit 216 supplies X, Y, X', and Y'. In this case, the data transform unit 217 determines R, G, and B by the following equations (5) to (7):

$$G=X+Y \tag{5}$$

$$B=Y-X \tag{6}$$

$$R=Y'-X' \tag{7}$$

Then, the data transform unit 217 transforms the respective integer-precision image data of components of R, G, and B into floating point precision.

In addition, for example, as explained above in relation to the first embodiment, when X and Y for the image data of RGB components are defined as in the foregoing equations (1) and (2) and X, Y, and R are encoded, the wavelet inverse transform unit 216 supplies X, Y, and R. In this case, the data transform unit 217 determines G and B by the foregoing equations (5) and (6) (R can be obtained without transformation).

Then, the data transform unit 217 transforms the respective integer-precision image data of components of R, G, and B into floating point precision.

That is, the data transform unit 217 may transform the differential data obtained by decoding into the integer-precision image data, and may further transform the same into the floating point-precision image data. As a matter of course, as explained above in relation to the first embodiment, the method of generating the differential data (the combination of components and the like) is not limited to the foregoing one but can be set arbitrarily. In any case, the data transform unit 217 transforms the data into floating point precision by a method corresponding to the transformation into integer precision by the data transform unit 112.

The data transform unit 217 outputs the floating point-precision image data after transformation to the outside of the image decoding apparatus 200. Note that when the image data before encoding was of integer precision, the data transform unit 217 omits data transformation, and outputs the supplied integer-precision image data as it is to the outside of the image decoding apparatus 200.

As illustrated in FIG. 14, the EBCOT unit 213 to the wavelet inverse transform unit 216 may be set collectively as a decoding unit 220. The configuration of the EBCOT unit 213 to the wavelet inverse transform unit 216 described above is a configuration example in the case where the image decoding apparatus 200 decodes the encoded data by the JPEG2000 method. However, the method of decoding by the image decoding apparatus 200 is not limited to JPEG2000 but can be arbitrarily set as far as it corresponds to the method of encoding by the image encoding apparatus 100. That is, the internal configuration of the decoding unit 220 can be arbitrarily set, and is not limited to the example of FIG. 14. More suitable components are desirably used depending on the type and feature of the image.

As described above, the image decoding apparatus 200 decodes the encoded data obtained by transforming the floating point-precision image data into the integer-precision image data and encoding the same, and transforms the obtained integer-precision image data into floating point precision. This makes it possible to suppress increase in data length and load. In the case of lossless decoding in particular, it is possible to further suppress increase in data length and load. In addition, in the case of lossy decoding, suppressing increase in data length makes it possible to suppress reduction in the amount of information due to discarding, quantization, or the like and suppress reduction in image quality of the decoded image.

In addition, as described above, the information on the precision of the image data added to the encoded data is analyzed, which makes it easier to grasp the necessity of data transform at the time of decoding, the method thereof, and the like. That is, it is possible to reduce the load of decoding process.

Incidentally, the additional information analyzed by the file format analysis unit 211 (the information on the precision of the image data) may be stored in any position of the file. In addition, the additional information may be filed as a file different from the file of the encoded data. In that case, when the both files are associated with each other, the file format analysis unit 211 can obtain the additional information necessary for the file to be decoded in accordance with the association. Further, the additional information may be stored in the lower bits of the image data and encoded.

<Flow of an Image Decoding Process>

An example of flow of an image decoding process by the image decoding apparatus 200 illustrated in FIG. 14 will be explained with reference to the flowchart of FIG. 15. When a file including encoded data is input, the image decoding process is started.

At step S201, the file format analysis unit 211 analyzes the file format.

At step S202, the data extraction unit 212 extracts the encoded data of the image data from the input file on the basis of the analysis result at step S201.

At step S203, the EBCOT unit 213 subjects the extracted encoded data to entropy decoding on the basis of the analysis result at step S201.

At step S204, the selection unit 214 determines whether the encoded data decoded by the EBCOT unit 213 was encoded by the lossy method on the basis of the analysis result at step S201. When it is determined that the data was encoded by the lossy method, the process moves to step S205.

At step S205, the inverse quantization unit 215 subjects the coefficient data obtained by the entropy decoding to inverse quantization on the basis of the analysis result of step S201. Upon completion of the inverse quantization, the process moves to step S206. Meanwhile, it is determined at step S204 that the data was encoded by the lossless method, the process moves to step S206.

At step S206, the wavelet inverse transform unit 216 subjects the coefficient data to wavelet inverse transformation on the basis of the analysis result of step S201.

At step S207, the data transform unit 217 determines whether the image data before encoding is of floating point precision on the basis of the analysis result of step S201. When it is determined that the image data before encoding is of floating point precision, the process moves to step S208.

At step S208, the data transform unit 217 transforms the integer-precision image data into a sign (S), an exponent (E), and a mantissa (M) on the basis of the analysis result of step S201. Upon completion of the data transformation, the image decoding process is terminated. Meanwhile, it is determined at step S207 that the image data before encoding is of integer precision, the image decoding process is terminated.

By performing the steps as described above, it is possible to suppress increase in the load of decoding for obtaining the floating point-precision image data.

<3. Third Embodiment>
<Image Encoding Apparatus>

The transformation of the floating point-precision image data composed of a sign, an exponent, and a mantissa into integer precision has been explained so far. However, data transformation is not limited to this but the floating point-precision image data composed of a sign, an exponent, and a mantissa may be transformed into value h of floating point precision.

For instance, as in the example of FIG. 2, the floating point-precision image data represented by a 1-bit sign (S), a 5-bit exponent (E), and a 10-bit mantissa (M) can be transformed into the value h of floating point precision as described in the following equation (8) when the exponent (E) takes a value of zero:

$$h=(-1)^s \times 2^{(-14)} \times (M/2^{10}) \tag{8}$$

In addition, when the exponent (E) does not take a value of zero, the floating point-precision image data can be transformed into the value h of floating point precision as described in the following equation (9):

$$h=(-1)^s \times 2^{(E-15)} \times (1+M/2^{10}) \tag{9}$$

In this case, a configuration example of an image encoding apparatus is similar to that of the first embodiment. That is, the image encoding apparatus 100 illustrated in FIG. 1 can be applied.

In this case, however, the data transform unit 112 transforms the floating point-precision image data composed of a sign, an exponent, and a mantissa into the value h of floating point precision as in the foregoing equation (8) or (9). The wavelet transformation unit 113 to the file format generation unit 117 process the value h of floating point precision as image data. In addition, the file format generation unit 117 generates additional information and stores the same in the JPX file format, for example, in a manner similar to that of the first embodiment.

According to this, the image encoding apparatus 100 can encode the floating point-precision image data. In the case of lossy encoding in particular, even when the input data is of floating point precision, the effect of decreasing the bit depth due to discarding, rounding, or quantization is exerted on a predetermined bit precision and higher ones, thereby making it possible to suppress increase in the load of encoding process and avoid the occurrence of an overflow.

In addition, adding the information on the precision of the image data to the encoded data in a manner similar to the first embodiment makes it easier to grasp the necessity of data transform at the time of decoding, the method thereof, and the like. That is, it is possible to reduce the load of decoding process.

Incidentally, in a manner similar to the first embodiment, the fixed point-precision image data can be processed in a manner similar to the integer-precision image data, and descriptions thereof will be omitted. In the following description, only the case where the image data is of integer precision and the case where the image data is of floating point precision will be explained.

<Flow of an Image Encoding Process>

Figure 16:
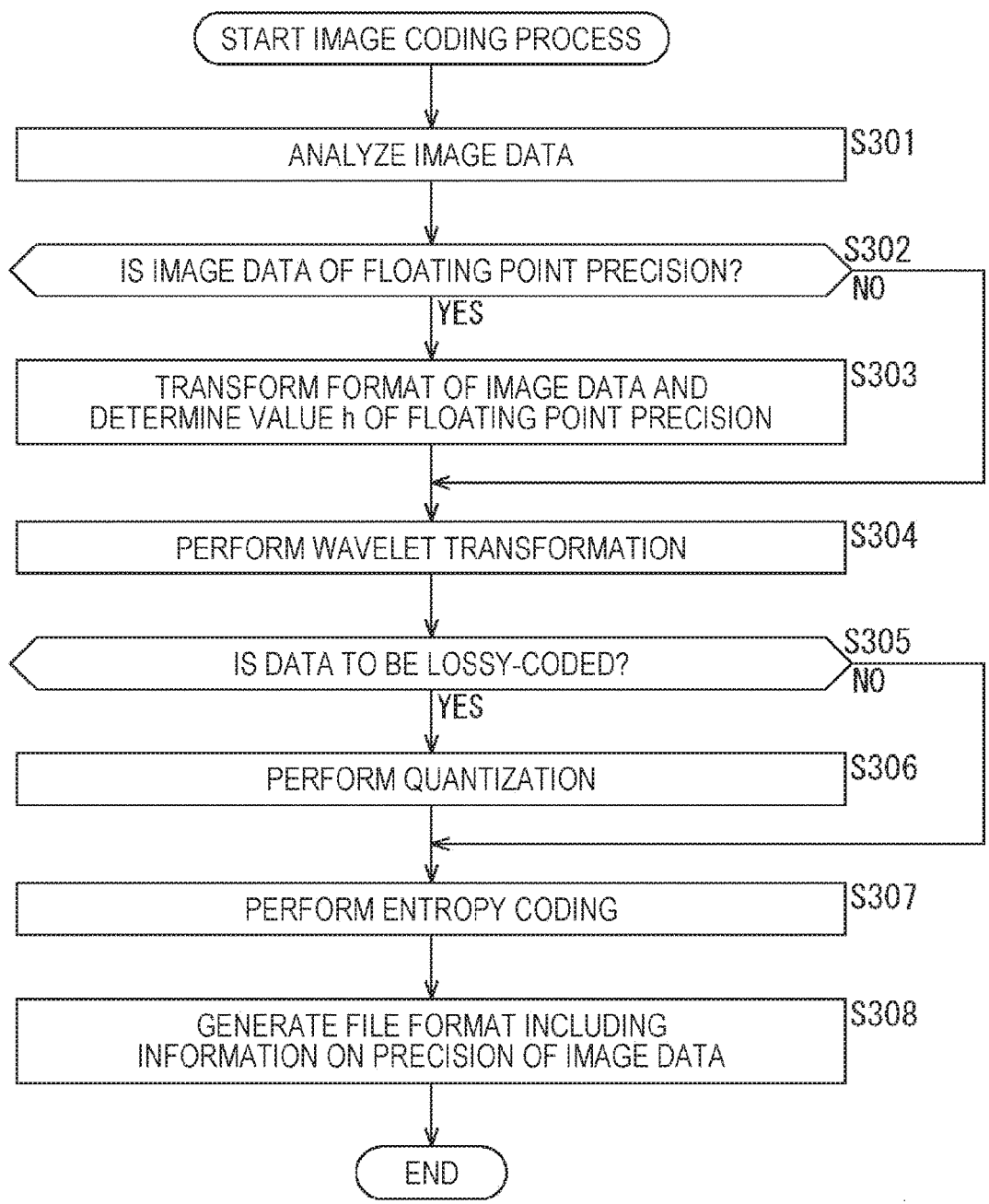
FIG. 16 is a flowchart of another example of an image encoding process.
Figure 17:
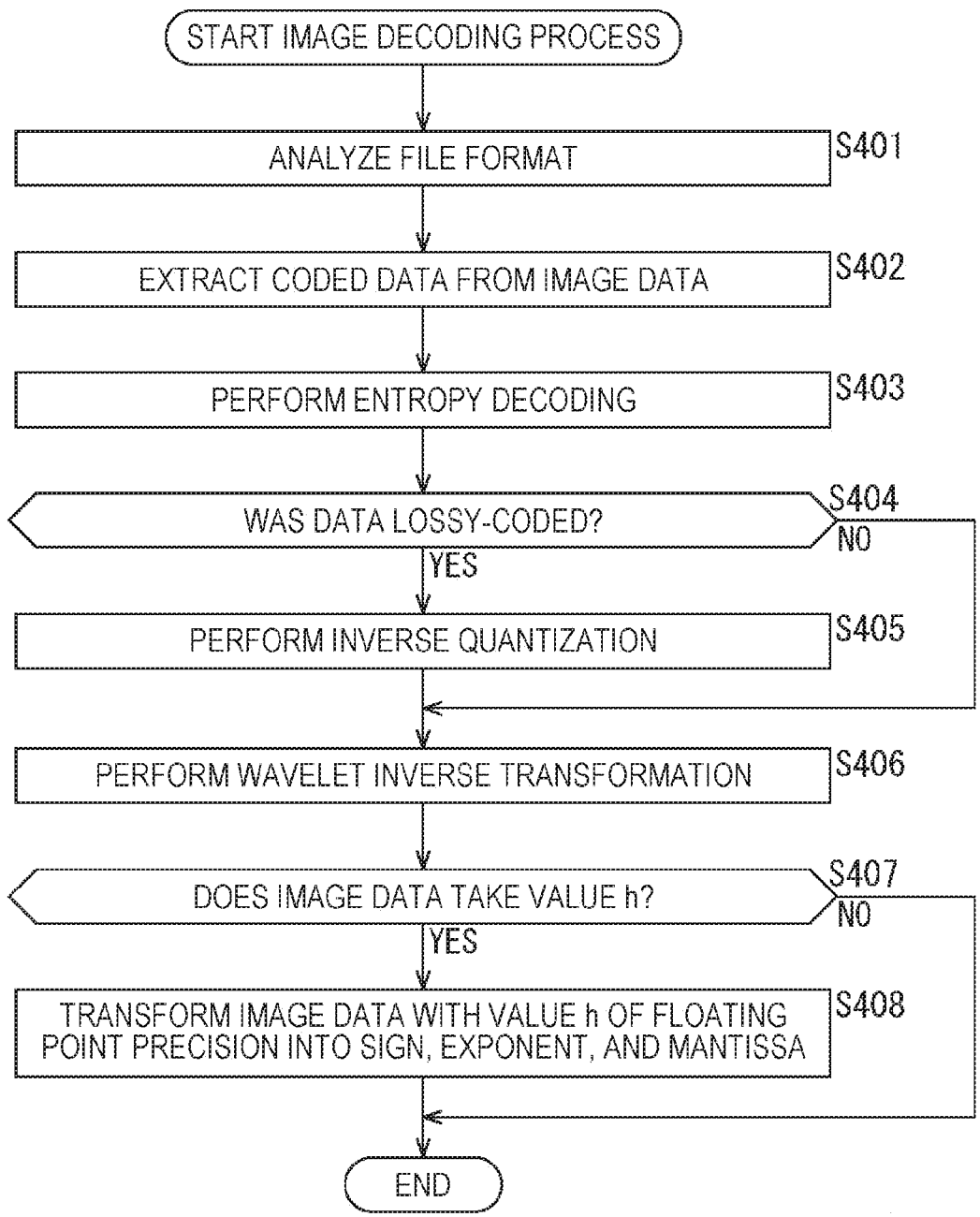
FIG. 17 is a flowchart of another example of an image decoding process.

An example of flow of an image encoding process in this case will be explained with reference to the flowchart of FIG. 16. When image data is input, the image encoding process is started.

The analysis unit 111 analyzes the input image data at step S301, and determines whether the image data is of floating point precision at step S302. When it is determined that the floating point-precision image data is input, the process moves to step S303.

At step S303, the data transform unit 112 transforms the floating point-precision image data composed of a sign, an exponent, and a mantissa into the value h of floating point precision. Upon completion of the transformation, the process moves to step S304. Meanwhile, when it is determined at step S302 that the input image data is of integer precision, the process moves to step S304.

At step S304, the wavelet transformation unit 113 performs wavelet transformation on the image data.

At step S305, the selection unit 114 determines whether to encode the image data by the lossy method. When it is determined to perform lossy encoding, the process moves to step S306.

At step S306, the quantization unit 115 quantizes the coefficient data of the image data having been subjected to wavelet transformation. Upon completion of the quantization, the process moves to step S307. Meanwhile, when it is determined at step S305 to perform lossless encoding, the process moves to step S307.

At step S307, the EBCOT unit 116 subjects the coefficient data (or the quantized coefficient data) to entropy encoding.

At step S308, the file format generation unit 117 generates a file format including the information on the precision of the image data.

Upon completion of step S308, the image encoding process is terminated.

By performing the steps as described above, it is possible to suppress increase in the load of encoding and decoding the floating point-precision image data.

<4. Fourth Embodiment>
<Image Encoding Apparatus>

Next, decoding of the encoded data (code stream) generated by the image encoding apparatus 100 explained above in relation to the third embodiment will be explained.

In the foregoing example, as explained above in relation to the third embodiment, when the floating point-precision image data composed of a sign, an exponent, and a mantissa is transformed into the value h of floating point precision and encoded, the encoded data may be decoded and the obtained value h of floating point precision may be transformed into floating point-precision image data composed of a sign, an exponent, and a mantissa.

A configuration example of the image decoding apparatus in this case is similar to the case of the second embodiment. That is, the image decoding apparatus 200 illustrated in FIG. 14 can be applied.

In this case, however, the data transform unit 217 transforms the value h of floating point precision into the floating point-precision image data composed of a sign, an exponent, and a mantissa by using the foregoing equation (8) or (9). The file format analysis unit 211 to the wavelet inverse transform unit 216 perform the processes in a manner similar to the second embodiment.

As described above, the image decoding apparatus 200 decodes the encoded data obtained by transforming from the floating point-precision image data composed of a sign, an exponent, and a mantissa into the image data with the value h of floating point precision and encoding the same, and transforms the obtained value h of floating point precision into the sign, the exponent, and the mantissa. This makes it possible to suppress increase in data length and load. In the case of lossy decoding, the effect of decreasing the bit depth due to discarding, rounding, or quantization is exerted on a predetermined bit precision and higher ones, thereby making it possible to suppress increase in the load of encoding process and avoid the occurrence of an overflow.

In addition, as described above, the information on the precision of the image data added to the encoded data is analyzed, which makes it easier to grasp the necessity of data transform at the time of decoding, the method thereof, and the like. That is, it is possible to reduce the load of decoding process.

<5. Fifth Embodiment>
<Image Encoding Apparatus>

As explained above in relation to the first embodiment, in the case of lossless encoding, transforming the floating point-precision image data into the integer-precision image data and encoding the same makes it possible to further suppress increase in data length and load. In addition, as explained above in relation to the third embodiment, in the case of lossy encoding, even when the input image data is of floating point precision, the effect of decreasing the bit depth due to discarding, rounding, or quantization is exerted on a predetermined bit precision and higher ones, thereby making it possible to suppress increase in the load of encoding process and avoid the occurrence of an overflow.

Accordingly, in the case of lossless encoding, the image encoding apparatus may transform the floating point-precision image data into the integer-precision image data and encode the same, and in the case of lossy encoding, the image encoding apparatus may transform the floating point-precision image data into the value of floating point-precision and encode the same.

That is, when the encoding unit 120 performs lossless encoding, the data transform unit 112 transforms the floating point-precision image data into the integer-precision image data, and when the encoding unit 120 performs lossy encoding, the data transform unit 112 transforms the floating point-precision image data into the value of floating point-precision. In the case of performing lossless encoding, the encoding unit 120 may encode the integer-precision image data obtained through transformation by the data transform unit 112, and in the case of performing lossy encoding, the encoding unit 120 may encode the value of floating point-precision obtained through transformation by the data transform unit 112.

Figure 18:
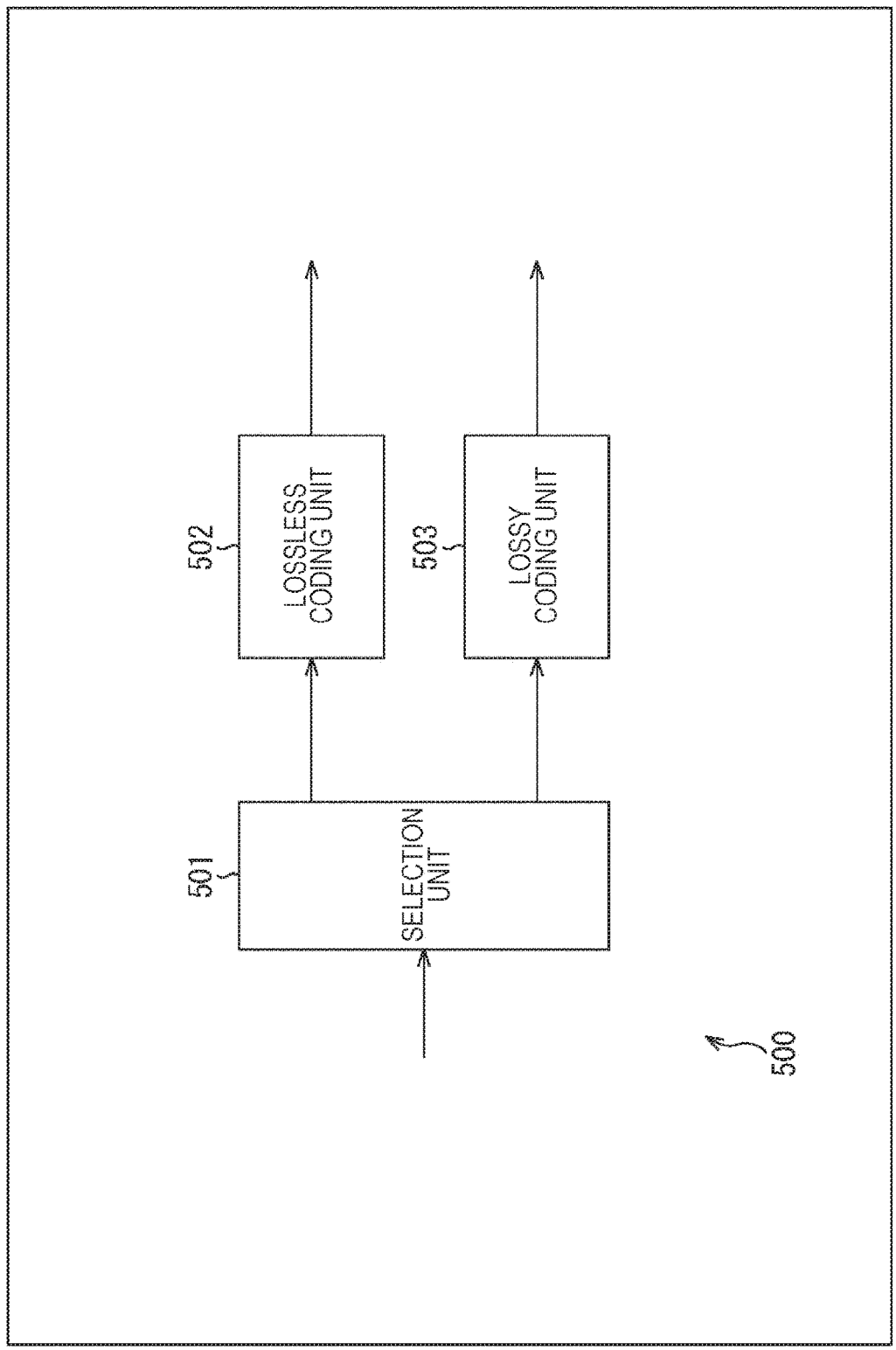
FIG. 18 is a block diagram of another configuration example of an image encoding apparatus.

FIG. 18 illustrates a main configuration example of an image encoding apparatus in that case. As illustrated in FIG. 18, in this case, an image encoding apparatus 500 has a selection unit 501, a lossless encoding unit 502, and a lossy encoding unit 503.

The selection unit 501 selects the supply destination of the input floating point-precision image data. For example, in the case of performing lossless encoding on the input floating point-precision image data, the selection unit 501 supplies the data to the lossless encoding unit 502, and in the case of performing lossy encoding on the data, the selection unit 501 supplies the data to the lossy encoding unit 503.

Whether to perform lossless encoding or lossy encoding may be decided on the basis of arbitrary information. For example, the decision may be made in advance by the user or the like or may be made as appropriate depending on the image data, the processing load, or the like.

The lossless encoding unit 502 performs lossless encoding on the image data supplied by the selection unit 501. At that time, the lossless encoding unit 502 transforms the floating point-precision image data composed of a sign, an exponent, and a mantissa into the integer-precision image data and encodes the same in a manner similar to the first embodiment. That is, the lossless encoding unit 502 is configured in a manner similar to the image encoding apparatus 100 illustrated in FIG. 1. However, the lossless encoding unit 502 performs only lossless encoding and thus the selection unit 114 and the quantization unit 115 can be omitted. The lossless encoding unit 502 outputs the file including the encoded data obtained by encoding to the outside of the image encoding apparatus 500.

The lossy encoding unit 503 performs lossy encoding on the image data supplied by the selection unit 501. At that time, the lossy encoding unit 503 transforms the floating point-precision image data composed of a sign, an exponent, and a mantissa into the image data with the value h of floating point precision and encodes the same in a manner similar to the third embodiment. That is, the lossy encoding unit 503 is configured in a manner similar to the image encoding apparatus 100 illustrated in FIG. 1. However, the lossy encoding unit 503 performs only lossy encoding and thus the selection unit 114 can be omitted. The lossy encoding unit 503 outputs the file including the encoded data obtained by encoding to the outside of the image encoding apparatus 500.

In such a manner as described above, the image encoding apparatus 500 can switch the method of data transformation and the encoding method between lossless encoding and lossy encoding. In either case, it is possible to suppress increase in the load of encoding process and avoid the occurrence of an overflow. In addition, the image encoding apparatus 500 adds the information on the precision of the image data as additional information to the encoded data. Accordingly, it is possible to grasp easily the necessity of data transform at the time of decoding and the method thereof, and the like, and reduce the load of decoding process.

<Flow of an Image Encoding Process>

Figure 19:
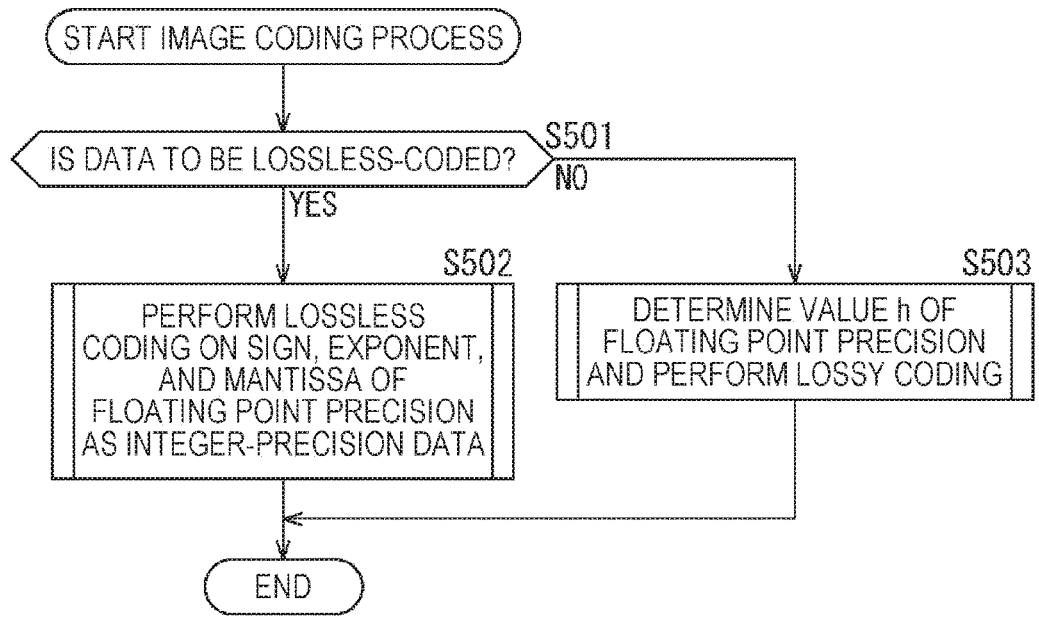
FIG. 19 is a flowchart of still another example of an image encoding process.

An example of flow of an image encoding process in this case will be explained with reference to the flowchart of FIG. 19. When image data is input, the image encoding process is started.

At step S501, the selection unit 501 determines whether to encode the input image data by the lossless method. When it is determined to perform lossless encoding, the process moves to step S502.

At step S502, the lossless encoding unit 502 transforms the sign (S), the exponent (E), and the mantissa (M) of floating point precision of the input image data into the integer-precision image data and performs lossless encoding on the same. Step S502 is similar to that in the image encoding process explained above in relation to the flow chart of FIG. 13, and descriptions thereof will be omitted. However, lossless encoding is performed here and thus steps S105 and S106 described in FIG. 13 may be omitted.

Upon completion of step S502, the image encoding process is terminated.

Meanwhile, it is determined at step S501 to perform lossy encoding, the process moves to step S503.

At step S503, the lossy encoding unit 503 transforms the sign (S), the exponent (E), and the mantissa (M) of floating point precision of the input image data into the image data with the value h of floating point precision, and performs lossy encoding on the same. Step S503 is similar to that in the image encoding process explained above with reference to the flowchart of FIG. 16, and descriptions thereof will be omitted. However, lossy encoding is performed here and thus step S305 described in FIG. 16 may be omitted.

Upon completion of step S503, the image encoding process is terminated.

By performing the steps as described above, it is possible to suppress increase in the load of encoding and decoding the floating point-precision image data.

<6. Sixth Embodiment>
<Image Decoding Apparatus>

Next, decoding of the encoded data (code stream) generated by the image encoding apparatus 500 explained above in relation to the fifth embodiment will be explained.

In correspondence with the image encoding apparatus 500, in the case of lossless decoding, the image decoding apparatus may decode the encoded data, transform the obtained integer-precision image data into the floating point-precision image data, and in the case of lossy decoding, the image decoding apparatus may decode the encoded data and transform the obtained image data with the value h of floating point precision into the floating point-precision image data composed of a sign, an exponent, and a mantissa.

That is, when the encoded data is obtained by performing lossless encoding on the integer-precision image data obtained by transforming the floating point-precision image data composed of a sign, an exponent, and a mantissa, the decoding unit 220 may perform lossless decoding on the encoded data, and the data transform unit 112 may transform the integer-precision image data obtained through lossless decoding by the decoding unit 220 into the floating point-precision image data. In addition, when the encoded data is obtained by performing lossy encoding on the value of floating point precision obtained by transforming the floating point-precision image data composed of a sign, an exponent, and a mantissa, the decoding unit 220 performs lossy decoding on the encoded data and the data trans form unit 217 may transform the value of floating point precision obtained through lossy decoding by the decoding unit 220 into the floating point-precision image data.

Figure 20:
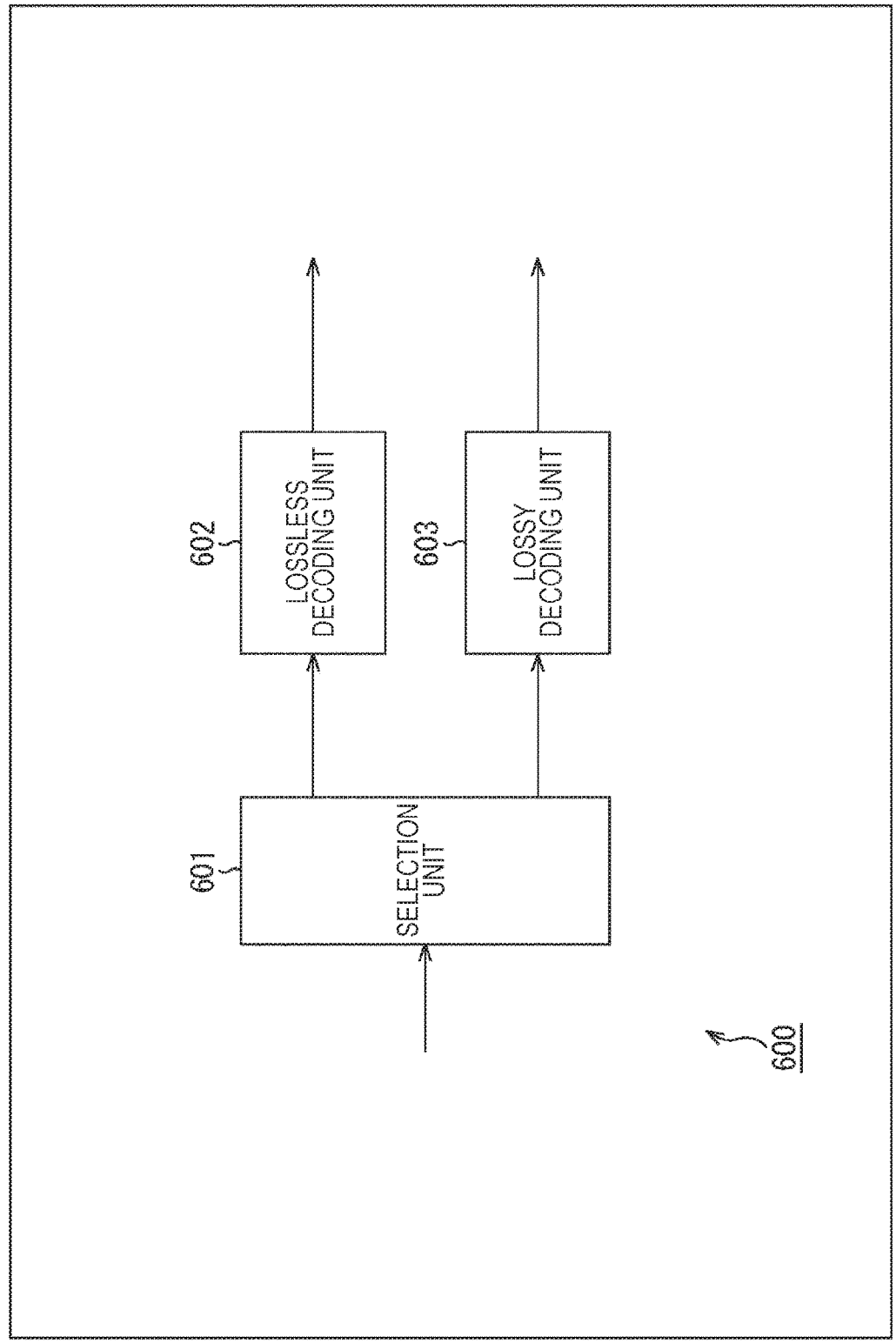
FIG. 20 is a block diagram of another configuration example of an image decoding apparatus.

FIG. 20 illustrates a main configuration example of an image decoding apparatus in that case. As illustrated in FIG. 20, in this case, an image decoding apparatus 600 has a selection unit 601, a lossless decoding unit 602, and a lossy decoding unit 603.

The selection unit 601 selects the supply destination of the file including the input encoded data. For example, in the case of performing lossless decoding on the encoded data, the selection unit 601 supplies the input file to the lossless decoding unit 602. In addition, in the case of performing lossy decoding on the encoded data, the selection unit 601 supplies the input file to the lossy decoding unit 603.

The lossless decoding unit 602 performs lossless decoding on the file supplied by the selection unit 601. At that time, in a manner similar to the second embodiment, the lossless decoding unit 602 extracts the encoded data from the file and performs lossless decoding on the same, and transforms the obtained integer-precision image data into the floating point-precision image data composed of a sign, an exponent, and a mantissa. That is, the lossless decoding unit 602 is configured in a manner similar to the image decoding apparatus 200 illustrated in FIG. 14. However, the lossless decoding unit 602 performs only lossless decoding and thus the selection unit 214 and the inverse quantization unit 215 can be omitted. The lossless decoding unit 602 outputs the obtained floating point-precision image data composed of a sign, an exponent, and a mantissa to the outside of the image decoding apparatus 600.

The lossy decoding unit 603 performs lossy decoding on the file supplied by the selection unit 601. At that time, in a manner similar to the fourth embodiment, the lossy decoding unit 603 extracts the encoded data from the file and performs lossy decoding on the same, and transforms the obtained image data with the value h of floating point precision into the floating point-precision image data composed of a sign, an exponent, and a mantissa. That is, the lossy decoding unit 603 is configured in a manner similar to the image decoding apparatus 200 illustrated FIG. 14. However, the lossy decoding unit 603 performs only lossy decoding and thus the selection unit 214 can be omitted. The lossy decoding unit 603 outputs the obtained floating point-precision image data composed of a sign, an exponent, and a mantissa to the outside of the image decoding apparatus 600.

In such a manner as described above, the image decoding apparatus 600 can switch the method of data transformation between lossless decoding and lossy decoding. In either case, it is possible to suppress increase in the load of encoding process and avoid the occurrence of an overflow. In addition, the image decoding apparatus 600 refers to the information on the precision of the image data added as additional information to the encoded data to perform decoding on the basis of the information. Accordingly, it is possible to grasp easily the necessity of data transform at the time of decoding and the method thereof, and the like, and reduce the load of decoding process.

<Flow of an Image Encoding Process>

Figure 21:
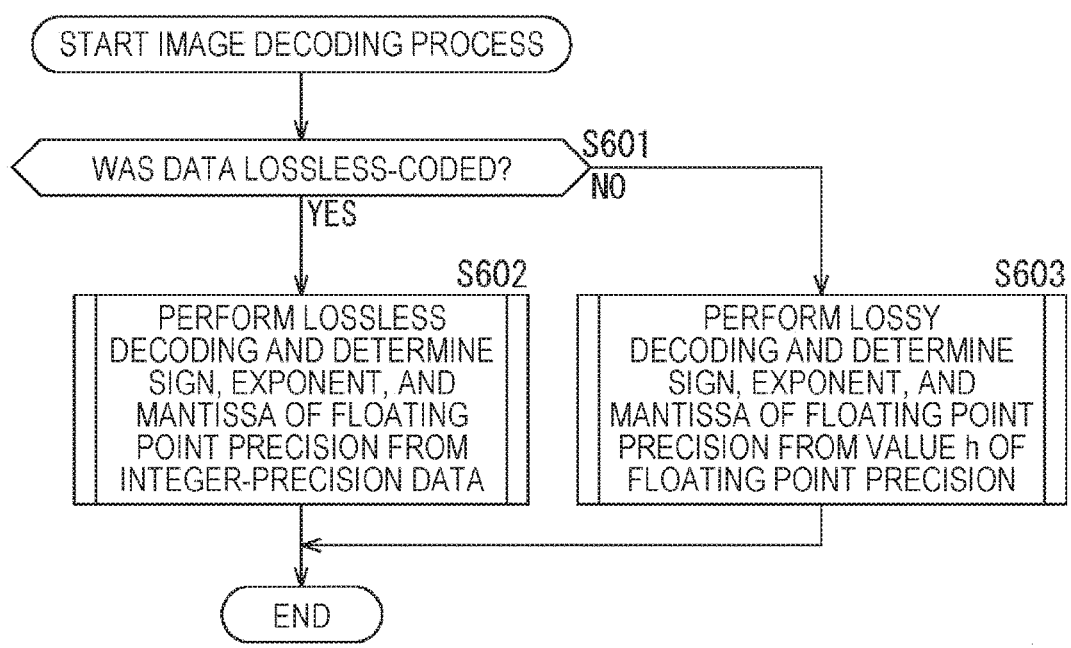
FIG. 21 is a flowchart of still another example of an image decoding process.

An example of flow of an image decoding process in this case will be explained with reference to the flowchart of FIG. 21. When image data is input, the image decoding process is started.

At step S601, the selection unit 601 determines whether the encoded data in the input file was encoded by the lossless method. When it is determined that the encoded data was lossless-encoded, the process moves to step S602.

At step S602, the lossless decoding unit 602 extracts the encoded data from the input file, performs lossless decoding on the encoded data, and transforms the obtained integer-precision image data into floating point-precision image data composed of a sign (S), an exponent (E), and a mantissa (M). Step S602 is similar to that in the image decoding process explained above with reference to the flowchart of FIG. 15, and descriptions thereof will be omitted. However, lossless decoding is performed here and thus steps S204 and S205 described in FIG. 15 may be omitted.

Upon completion of step S602, the image decoding process is terminated. Meanwhile, it is determined at step S601 that the data was lossy-encoded, the process moves to step S603.

At step S603, the lossy decoding unit 603 extracts the encoded data from the input file, performs lossy decoding on the encoded data, and transforms the obtained image data with the value h of floating point precision into the floating point-precision image data composed of a sign (S), an exponent (E), and a mantissa (M). However, lossy decoding is performed here and thus step S204 described in FIG. 15 may be omitted.

Upon completion of step S603, the image decoding process is terminated.

By performing the steps as described above, it is possible to suppress increase in the load of decoding the floating point-precision image data.

<7. Seventh Embodiment>
<Computer>

The foregoing series of processes may be executed by hardware or software. To execute the series of processes by software, programs constituting the software are installed in a computer. The computer here may be a computer incorporated into dedicated hardware or a general-purpose personal computer that can execute various functions by installing various programs or the like, for example.

Figure 22:
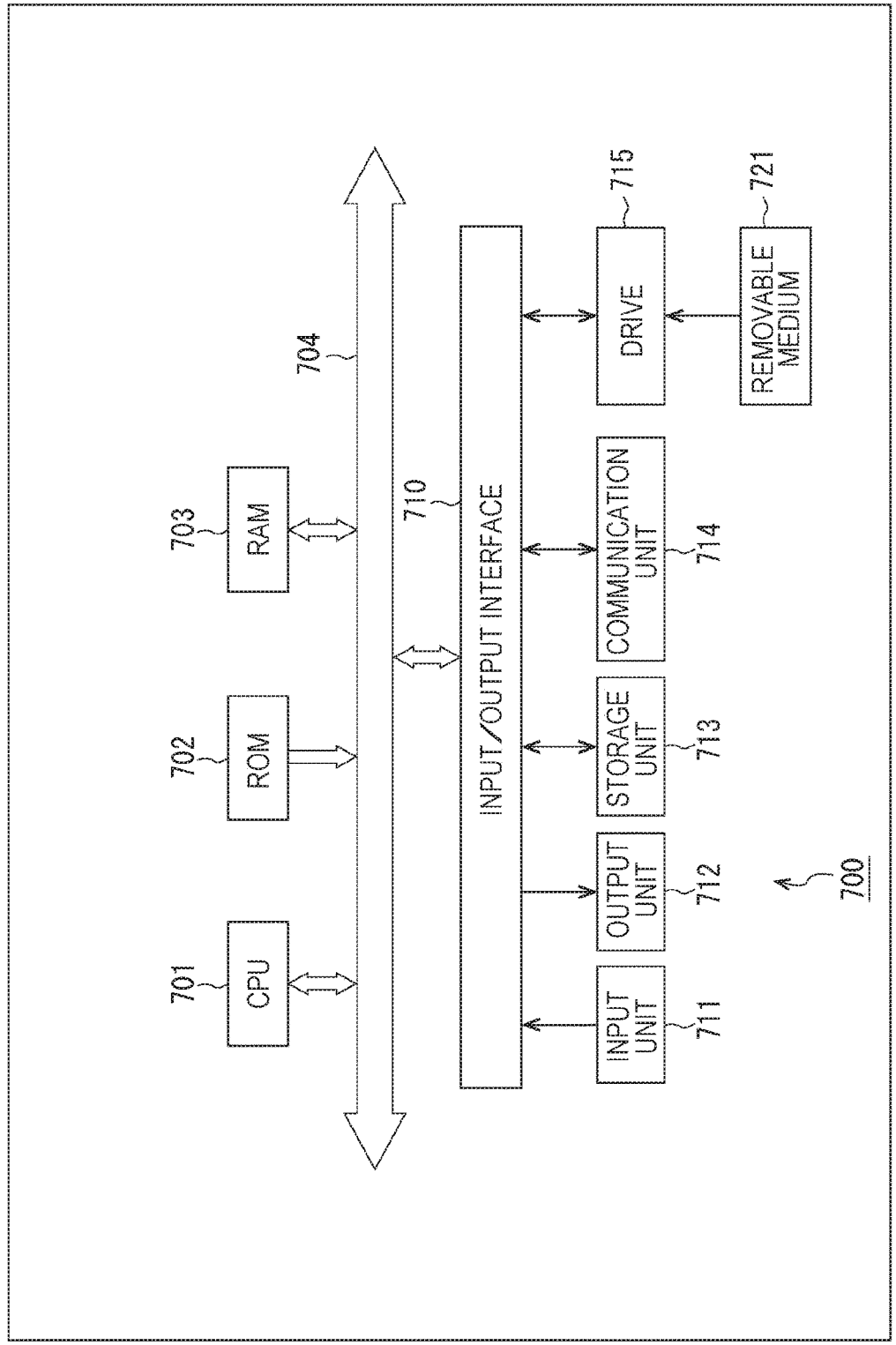
FIG. 22 is a block diagram of a main configuration example of a computer.

FIG. 22 is a block diagram illustrating a configuration example of hardware in a computer executing the foregoing series of processes by a program.

In a computer 700 illustrated in FIG. 22, a central processing unit (CPU) 701, a read only memory (ROM) 702, and a random access memory (RAM) 703 are connected together via a bus 704.

An input/output interface 710 is also connected to the bus 704. An input unit 711, an output unit 712, a storage unit 713, a communication unit 714, and a drive 715 are connected to the input/output interface 710.

The input unit 711 is composed of a keyboard, a mouse, a microphone, a touch panel, an input terminal, and the like, for example. The output unit 712 is composed of a display, a speaker, an output terminal, and the like, for example. The storage unit 713 is composed of a hard disc, a RAM disc, a non-volatile memory, and the like, for example. The communication unit 714 is composed of a network interface, for example. The drive 715 drives a magnetic disc, an optical disc, a magneto-optical disc, or a removable medium 721 such as a semiconductor memory.

In the thus configured computer, the foregoing series of processes is carried out by the CPU 701 loading the programs stored in the storage unit 713 via the input/output interface 710 and the bus 704 into the RAM 703 and executing the same, for example. The RAM 703 stores as appropriate data necessary for the CPU 701 to execute various processes.

The programs executed by the computer (CPU 701) can be recorded in a removable medium 721 as a package medium or the like, for example. In that case, the program can be installed in the storage unit 713 via the input/output interface 710 by attaching the removable medium 721 to the drive 715.

In addition, the programs can also be provided via a wired or wireless transmission medium such as a local area network, the Internet, or digital satellite broadcasting. In that case, the programs can be received by the communication unit 714 and installed into the storage unit 713.

Besides, the programs can be installed in advance in the ROM 702 or the storage unit 713.

Note that the programs executed by the computer may be programs processed in time series in accordance with the sequence explained herein or may be programs processed in parallel or at necessary timing such as upon receipt of an invocation.

In addition, the steps describing the programs recorded in a recording medium explained herein include not only processes performed in time series in accordance with the described sequence but also processes that are not necessarily performed in time series but are executed in parallel or individually.

In addition, the foregoing steps can be performed in the apparatuses described above or any apparatus other than the apparatuses described above. In that case, the apparatuses to perform the steps have functions necessary for performing the steps (functional blocks or the like). In addition, the information necessary for performing the steps is transmitted as appropriate to the apparatuses.

In addition, the system explained herein refers to an assembly of constituent elements (apparatuses, modules (components), and the like). However, all of the constituent elements may not necessarily be in the same housing. Therefore, the system may be composed of a plurality of apparatuses stored in separate housings and connected via a network or one apparatus with a plurality of modules stored in one housing.

In addition, one apparatus (or one processing unit) explained above as may be divided into a plurality of apparatuses (or a plurality of processing units). Conversely, a plurality of apparatuses (or a plurality of processing units) explained above may be collectively configured as one apparatus (or one processing unit). In addition, as a matter of course, any component other than those described above may be added to the apparatuses (or the processing units). Further, some components of an apparatus (or a processing unit) may be included in another apparatus (or another processing unit) as far as the entire system is configured and operated in substantially the same manner.

Preferred embodiments of the present disclosure have been explained so far in detail with reference to the attached drawings. However, the technical scope of the present disclosure is not limited to the foregoing examples. Apparently, those with general knowledge in the technical field of the present disclosure could conceive various alternation examples or modification examples within the scope of the technical idea described in the claims, and these examples are naturally considered to fall within the technical scope of the present disclosure.

For example, the present technology can be configured as a cloud computing system in which one function is shared among a plurality of apparatuses via a network and is performed in coordination with one another.

In addition, the steps explained in the foregoing flowcharts may be executed by one apparatus or may be shared and executed by a plurality of apparatuses.

Further, when one step includes a plurality of processes, the plurality of processes included in the one step may be executed by one apparatus or may be shared and executed by a plurality of apparatuses.

In addition, the present technology is not limited to the foregoing one but may be implemented as any component mounted in such an apparatus or apparatuses constituting a system, for example, a processor as a system large scale integration (LSI), a module using a plurality of processors, a unit using a plurality of modules, a set with still other functions added to the unit (that is, some of components of the apparatus), or the like.

For example, the present technology is applicable to, for example, equipment and devices using images captured by imaging elements (for example, complementary metal oxide semiconductor (CMOS) image sensors, charge coupled device (CCD) image sensors, and others), compression circuits writing images from imaging elements into memories, digital still cameras, video camcorders, medical image cameras, medical endoscopes, monitoring cameras, digital cinema shooting cameras, binocular image cameras, multi-ocular image cameras, memory reduction circuits on LSI chips, authoring tools on personal computers or their software modules, and the like.

Incidentally, the present technology can also be configured as follows:

(1) An image processing apparatus including:
a data transform unit that transforms floating point-precision image data composed of a sign, an exponent, and a mantissa into integer-precision image data; and
an encoding unit that encodes the integer-precision image data obtained through transformation by the data transform unit.

(2) The image processing apparatus according to (1), wherein the data transform unit transforms the image data into one integer-precision data in which data of the sign, data of the exponent, and data of the mantissa are arranged in this order from MSB to LSB for individual pixels.

(3) The image processing apparatus according to (1) or (2), wherein the data transform unit transforms the image data into three integer-precision image data in which data of the sign, data of the exponent, and data of the mantissa are independent of one another for individual pixels.

(4) The image processing apparatus according to any one of (1) to (3), wherein the data transform unit transforms data of the sign, data of the exponent, and data of the mantissa into three independent integer-precision image data for leading pixels of pictures of the image data, and transforms data of the exponent and data of the mantissa into two independent integer-precision image data for the other pixels.

(5) The image processing apparatus according to any one of (1) to (4), wherein
the data transform unit further transforms the integer-precision image data into differential data between components for individual pixels, and
the encoding unit encodes the differential data obtained through transformation by the data transform unit.

(6) The image processing apparatus according to any one of (1) to (5), wherein
when the encoding unit performs lossless encoding, the data transform unit transforms the floating point-precision image data into the integer-precision image data,
when the encoding unit performs lossy encoding, the data transform unit transforms the floating point-precision image data into the value of floating point precision,
when performing the lossless encoding, the encoding unit encodes the integer-precision image data obtained through transformation by the data transform unit, and
when performing the lossy encoding, the encoding unit encodes the value of floating point precision obtained through transformation by the data transform unit.

(7) The image processing apparatus according to any one of (1) to (6), wherein the encoding unit encodes the image data by a JPEG2000 encoding method.

(8) The image processing apparatus according to any one of (1) to (7), further including an addition unit that adds information on the data transformation by the data transform unit to the encoded data obtained through encoding by the encoding unit.

(9) The image processing apparatus according to (8), wherein
the encoding unit encodes the image data by a JPEG2000 encoding method, and
the addition unit adds the information to a predetermined position in a JPX file format.

(10) An image processing method including:

transforming floating point-precision image data composed of a sign, an exponent, and a mantissa into integer-precision image data; and encoding the integer-precision image data obtained by transformation.

(11) An image processing apparatus including:

a decoding unit that decodes encoded data of integer-precision image data obtained by transforming floating point-precision image data composed of a sign, an exponent, and a mantissa; and a data transform unit that transforms the integer-precision image data obtained through decoding by the decoding unit into the floating point-precision image data.

(12) The image processing apparatus according to (11), wherein the data transform unit divides the integer-precision image data into three data in accordance with bit numbers, and sets the same as data of the sign, data of the exponent, and data of the mantissa in order from MSB to LSB.

(13) The image processing apparatus according to (11) or (12), wherein the data transform unit sets the integer-precision image data into any one of data of the sign, data of the exponent, and data of the mantissa.

(14) The image processing apparatus according to any one of (11) to (13), wherein the data transform unit sets the integer-precision image data as any one of data of the sign, data of the exponent, and data of the mantissa for leading pixels of pictures of the image data, and sets the integer-precision image data as any one of data of the exponent and data of the mantissa for the other pixels.

(15) The image processing apparatus according to any one of (11) to (14), wherein the decoding unit decodes encoded data of differential data between components of the integer-precision image data, and the data trans form unit transforms the differential data obtained through decoding by the decoding unit into the integer-precision image data and further transforms the same into the floating point-precision image data.

(16) The image processing apparatus according to any one of (11) to (15), wherein when the encoded data is obtained by performing lossless encoding on integer-precision image data obtained by transforming floating point-precision image data composed of a sign, an exponent, and a mantissa, the decoding unit performs lossless decoding on the encoded data, and the data transform unit transforms the integer-precision image data obtained through lossless decoding by the decoding unit into the floating point-precision image data, and when the encoded data is obtained by performing lossy encoding on the value of floating point precision obtained by transforming the floating point-precision image data composed of a sign, an exponent, and a mantissa, the decoding unit performs lossy decoding on the encoded data, and the data transform unit transforms the value of floating point precision obtained through lossy decoding by the decoding unit into the floating point-precision image data.

(17) The image processing apparatus according to any one of (11) to (16), wherein the encoded data is encoded by a JPEG2000 encoding method, and the decoding unit decodes the encoded data by a JPEG2000 decoding method.

(18) The image processing apparatus according to any one of (11) to (17), further including an analysis unit that analyzes information on data transformation of image data added to the encoded data, wherein the data transform unit transforms the image data into the floating point-precision image data in accordance with the result of analysis by the analysis unit.

(19) The image processing apparatus according to (18), wherein the encoded data is encoded by the JPEG2000 encoding method, the analysis unit analyzes the information added to the encoded data in a predetermined position of a JPX file format, and the decoding unit decodes the encoded data by the JPEG2000 decoding method.

(20) An image processing method including:

decoding encoded data of integer-precision image data obtained by transforming floating point-precision image data composed of a sign, an exponent, and a mantissa; and transforming the integer-precision image data obtained by decoding into the floating point-precision image data.

REFERENCE SIGNS LIST

100 Image encoding apparatus
111 Analysis unit
112 Data transform unit
113 Wavelet transform unit
114 Selection unit
115 Quantization unit
116 EBCOT unit
117 File format generation unit
120 Encoding unit
200 Image decoding apparatus
211 File format analysis unit
212 Data extraction unit
213 EBCOT unit
214 Selection unit
215 Inverse quantization unit
216 Wavelet inverse transform unit
217 Data transform unit
220 Decoding unit
500 Image encoding apparatus
501 Selection unit
502 Lossless encoding unit
503 Lossy encoding unit
600 Image decoding apparatus
601 Selection unit
602 Losselss decoding unit
603 Lossy decoding unit
700 Computer

The invention claimed is:

1. An image processing apparatus comprising:

a data transform unit that transforms floating point-precision image data composed of a sign, an exponent, and a mantissa, into integer-precision image data, wherein at least a first pixel of the floating point-precision image data is transformed into three integer-precision image data in which data of the sign, data of the exponent, and data of the mantissa are independent of one another;

an encoding unit configured to encode the integer-precision image data obtained through transformation by the data transform unit; and an addition unit configured to add information to the encoded integer-precision image data obtained through the encoding operation by the encoding unit, wherein the added information indicates whether input image data is of floating point precision.

2. The image processing apparatus according to claim 1,
wherein the first pixel of the floating point-precision image data is a leading pixel of pictures of the floating point-precision image data, and
wherein the data transform unit is further configured to transform the data of the exponent, and data of the mantissa into three independent integer-precision image data for at least a second pixel which is other than the leading pixel.

3. The image processing apparatus according to claim 1,
wherein the data transform unit is further configured to transform the integer-precision image data into differential data between components for individual pixels, and
wherein the encoding unit is further configured to encode the differential data obtained through transformation by the data transform unit.

4. The image processing apparatus according to claim 1, wherein
when the encoding unit performs lossless encoding operation, the data transform unit is further configured to transform the floating point-precision image data into the integer-precision image data,
when the encoding unit performs lossy encoding, the data transform unit is further configured to transform the floating point-precision image data into a value of floating point precision,
when the encoding unit performs the lossless encoding, the encoding unit is further configured to encode the integer-precision image data obtained through transformation by the data transform unit, and
when the encoding unit performs the lossy encoding operation, the encoding unit is further configured to encode the value of floating point precision obtained through transformation by the data transform unit.

5. The image processing apparatus according to claim 1, wherein the encoding unit is further configured to encode the integer-precision image data by a JPEG2000 encoding method.

6. The image processing apparatus according to claim 1,
wherein the encoding unit is further configured to encode the integer-precision image data by a JPEG2000 encoding method, and
wherein the addition unit is further configured to add the information to a specific position in the encoded integer-precision image data in a JPX file format.

7. An image processing method comprising:
transforming floating point-precision image data composed of a sign, an exponent, and a mantissa, into integer-precision image data,
wherein at least a first pixel of the floating point-precision image data is transformed into three integer-precision image data in which data of the sign, data of the exponent, and data of the mantissa are independent of one another;
encoding the integer-precision image data obtained by transformation; and
adding information to the encoded integer-precision image data,
wherein the added information indicates whether input image data is of floating point precision.

* * * * *